(12) United States Patent
Heo et al.

(10) Patent No.: US 10,848,759 B2
(45) Date of Patent: Nov. 24, 2020

(54) INTRA PREDICTION MODE-BASED IMAGE PROCESSING METHOD AND APPARATUS THEREFOR

(71) Applicant: LG Electronics Inc., Seoul (KR)

(72) Inventors: Jin Heo, Seoul (KR); Yongjoon Jeon, Seoul (KR); Sunmi Yoo, Seoul (KR); Eunyong Son, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 15/748,028

(22) PCT Filed: Jun. 21, 2016

(86) PCT No.: PCT/KR2016/006580
§ 371 (c)(1),
(2) Date: Jan. 26, 2018

(87) PCT Pub. No.: WO2017/018664
PCT Pub. Date: Feb. 2, 2017

(65) Prior Publication Data
US 2018/0234679 A1    Aug. 16, 2018

Related U.S. Application Data

(60) Provisional application No. 62/197,581, filed on Jul. 28, 2015.

(51) Int. Cl.
*H04N 19/107*    (2014.01)
*H04N 19/159*    (2014.01)
(Continued)

(52) U.S. Cl.
CPC ......... *H04N 19/107* (2014.11); *H04N 19/105* (2014.11); *H04N 19/11* (2014.11);
(Continued)

(58) Field of Classification Search
CPC .... H04N 19/107; H04N 19/105; H04N 19/11; H04N 19/117; H04N 19/124;
(Continued)

(56) References Cited

U.S. PATENT DOCUMENTS

2011/0280304 A1* 11/2011 Jeon ............... H04N 19/105
375/240.12
2013/0108182 A1* 5/2013 Yie ............... H04N 19/523
382/233
(Continued)

FOREIGN PATENT DOCUMENTS

JP    2014131265    7/2014
KR    1020120003406    1/2012
(Continued)

OTHER PUBLICATIONS

International Search Report in International Application No. PCT/KR2016/006580, dated Oct. 4, 2016, 13 pages (with partial English translation).

*Primary Examiner* — Joseph G Ustaris
*Assistant Examiner* — Matthew David Kim
(74) *Attorney, Agent, or Firm* — Fish & Richardson P.C.

(57) ABSTRACT

An intra prediction mode-based image processing method includes: obtaining, on the basis of the intra prediction mode of a current block, a first prediction sample value and a second prediction sample value by using a reference sample neighboring the current block; and generating a prediction sample for the current block by linear interpolation of the first prediction sample value and the second prediction sample value.

10 Claims, 11 Drawing Sheets

(51) Int. Cl.
*H04N 19/176* (2014.01)
*H04N 19/117* (2014.01)
*H04N 19/124* (2014.01)
*H04N 19/59* (2014.01)
*H04N 19/105* (2014.01)
*H04N 19/11* (2014.01)
*H04N 19/172* (2014.01)
*H04N 19/61* (2014.01)
*H04N 19/70* (2014.01)

(52) U.S. Cl.
CPC ......... *H04N 19/117* (2014.11); *H04N 19/124* (2014.11); *H04N 19/159* (2014.11); *H04N 19/172* (2014.11); *H04N 19/176* (2014.11); *H04N 19/59* (2014.11); *H04N 19/61* (2014.11); *H04N 19/70* (2014.11)

(58) Field of Classification Search
CPC .. H04N 19/159; H04N 19/172; H04N 19/176; H04N 19/59; H04N 19/61
USPC .................................................. 375/240.13
See application file for complete search history.

(56) References Cited

U.S. PATENT DOCUMENTS

2013/0272405 A1* 10/2013 Jeon ..................... H04N 19/105
                                                         375/240.15
2015/0350640 A1* 12/2015 Jeong .................. H04N 19/176
                                                         375/240.12

FOREIGN PATENT DOCUMENTS

| KR | 1020130109963 | 10/2013 |
| KR | 1020130133250 | 12/2013 |
| WO | 2014003421 | 1/2014 |

\* cited by examiner

Intra:

2Nx2N

NxN

Inter:

2Nx2N

NxN

2NxN

Nx2N nLx2N nRx2N

2NxnU

2NxnD

INTRA PREDICTION MODE-BASED IMAGE PROCESSING METHOD AND APPARATUS THEREFOR

CROSS-REFERENCE TO RELATED APPLICATIONS

This application is a National Stage application under 35 U.S.C. § 371 of International Application No. PCT/KR2016/006580, filed Jun. 21, 2016, which claims the benefit of U.S. Application No. 62/197,581, filed on Jul. 28, 2015. The disclosures of the prior applications are incorporated by reference in their entirety.

TECHNICAL FIELD

The present invention relates to a still image or moving image processing method and, more particularly, to a method of encoding/decoding a still image or moving image based on an intra-prediction mode and an apparatus supporting the same.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

DISCLOSURE

Technical Problem

In the existing intra-frame prediction method (or intra-prediction method), a prediction sample is generated using a reference sample and the generated prediction sample is duplicated depending on the direction of an intra-frame prediction mode. The existing intra-frame prediction method has a problem in that the accuracy of prediction is reduced as the distance from reference samples becomes distant because a generated prediction sample value is simply duplicated.

In order to solve this problem, an object of the present invention is to propose a linear interpolation intra-prediction method of performing encoding/decoding using more reference samples.

An object of the present invention is to propose a linear interpolation intra-prediction method using the distance between a current sample and prediction samples.

The objects of the present invention are not limited to the technical objects described above, and other technical that are objects not mentioned herein may be understood to those skilled in the art from the description below.

Technical Solution

In an aspect of the present invention, a method of processing video based on an intra-prediction mode may include the steps of deriving a value of a first prediction sample and a value of a second prediction sample using neighboring reference samples of a current block based on an intra-prediction mode of the current block and generating a prediction sample for the current block by linearly interpolating the value of the first prediction sample and the value of the second prediction sample.

In an aspect of the present invention, an apparatus for processing video based on an intra-prediction mode may include a first prediction sample value derivation unit deriving a value of a first prediction sample using neighboring reference samples of a current block based on an intra-prediction mode of the current block, a second prediction sample value derivation unit deriving a value of a second prediction sample using neighboring reference samples of the current block based on the intra-prediction mode of the current block, and a prediction sample generation unit generating a prediction sample for the current block by linearly interpolating the value of the first prediction sample and the value of the second prediction sample.

Preferably, if the direction of the intra-prediction mode belongs to the region of a horizontal direction and positive angle direction, the value of the second prediction sample may be determined as a value of a top right reference sample neighboring the current block.

Preferably, if the direction of the intra-prediction mode belongs to the region of a vertical direction and positive angle direction, the value of the second prediction sample may be determined as a value of a bottom left reference sample neighboring the current block.

Preferably, the image processing method may further include the step of generating a bottom right reference sample neighboring the current block if the direction of the intra-prediction mode belongs to the region of a negative angle direction. The value of the second prediction sample may be determined as a value of the bottom right reference sample.

Preferably, the bottom right reference sample may be generated using a top right reference sample neighboring the current block and a bottom left reference sample neighboring the current block.

Preferably, if the current block is an N×N size and the horizontal and vertical coordinates of a top left sample of the current block are [0,0], the bottom right reference sample may be generated using a reference sample belonging to the neighboring reference samples of the current block and located in [2N−1, −1] and a reference sample belonging to the neighboring reference samples of the current block and located in [−1, 2N−1].

Preferably, a value of the bottom right reference sample may be transmitted from an encoder.

Preferably, the image processing method may further include the steps of generating a bottom right reference sample neighboring the current block and generating a right reference sample neighboring the right of the current block and a bottom reference sample neighboring the bottom of the current block.

Preferably, the right reference sample may be generated by linearly interpolating a top right reference sample neighboring the current block and the bottom right reference sample, and the bottom reference sample may be generated by linearly interpolating a bottom left reference sample neighboring the current block and the bottom right reference sample.

Preferably, if the direction of the intra-prediction mode belongs to the region of a horizontal direction and positive angle direction, the value of the second prediction sample may be derived as a value of a reference sample used for prediction depending on the intra-prediction mode among the right reference sample or a reference sample neighboring the top of the current block, or may be derived as a value obtained by linearly interpolating two reference samples.

Preferably, the image processing method may further include the step of generating a right reference sample array by duplicating a reference sample neighboring the top of the current block to the top of a right reference sample if the direction of the intra-prediction mode belongs to the region of a horizontal direction and positive angle direction. The value of the second prediction sample may be derived as a value of a reference sample used for prediction depending on the intra-prediction mode the right reference sample array, or may be derived as a value obtained by linearly interpolating two reference samples.

Preferably, if the direction of the intra-prediction mode belongs to the region of a vertical direction and positive angle direction, the value of the second prediction sample may be derived as a value of a reference sample used for prediction depending on the intra-prediction mode among the bottom reference sample or a reference sample neighboring the left of the current block, or may be derived as a value obtained by linearly interpolating two reference samples.

Preferably, the image processing method may further include the step of generating a bottom reference sample array by duplicating a reference sample neighboring the left of the current block to the left of the bottom reference sample if the direction of the intra-prediction mode belongs to the region of a vertical direction and positive angle direction. The value of the second prediction sample may be derived as a value of a reference sample used for prediction depending on the intra-prediction mode among the bottom reference sample array, or may be derived as a value obtained by linearly interpolating two reference samples.

Preferably, if the direction of the intra-prediction mode belongs to the region of a negative angle direction, the value of the second prediction sample may be derived as a value of a reference sample used for prediction depending on the intra-prediction mode among the right reference sample, the bottom reference sample or the bottom right reference sample, or may be derived as a value obtained by linearly interpolating two reference samples.

Preferably, the image processing method may further include the step of generating a right reference sample array by duplicating the bottom reference sample to the bottom of the right reference sample if the direction of the intra-prediction mode belongs to the region of a horizontal direction and negative angle direction. The value of the second prediction sample may be derived as a value of a reference sample used for prediction depending on the intra-prediction mode among the right reference sample array, or may derived as a value obtained by linearly interpolating two reference samples.

Preferably, the image processing method may further include the step of generating a bottom reference sample array by duplicating the right reference sample to the right of the bottom reference sample if the direction of the intra-prediction mode belongs to the region of a vertical direction and negative angle direction. The value of the second prediction sample may be derived as a value of a reference sample used for prediction depending on the intra-prediction mode among the bottom reference sample array, or may derived as a value obtained by linearly interpolating two reference samples.

Preferably, the prediction sample for the current block may be generated by linear interpolation based on weight values determined based on a vertical distance between the prediction sample and the place where the value of the first prediction sample may be derived and a vertical distance between the prediction sample and the place where the value of the second prediction sample may be derived.

Preferably, the prediction sample for the current block may be generated by linear interpolation based on weight values determined based on a distance between the prediction sample and the place where the value of the first prediction sample may be derived and a distance between the prediction sample and the place where the value of the second prediction sample may be derived.

Advantageous Effects

In accordance with an embodiment of the present invention, the accuracy of prediction can be improved by generating a plurality of prediction samples based on an intra-prediction mode and linearly interpolating the generated prediction samples.

Furthermore, in accordance with an embodiment of the present invention, an error can be reduced and compression performance can be improved by applying weight according to the distance between a current sample and prediction samples.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

MODE FOR INVENTION

Figure 1:
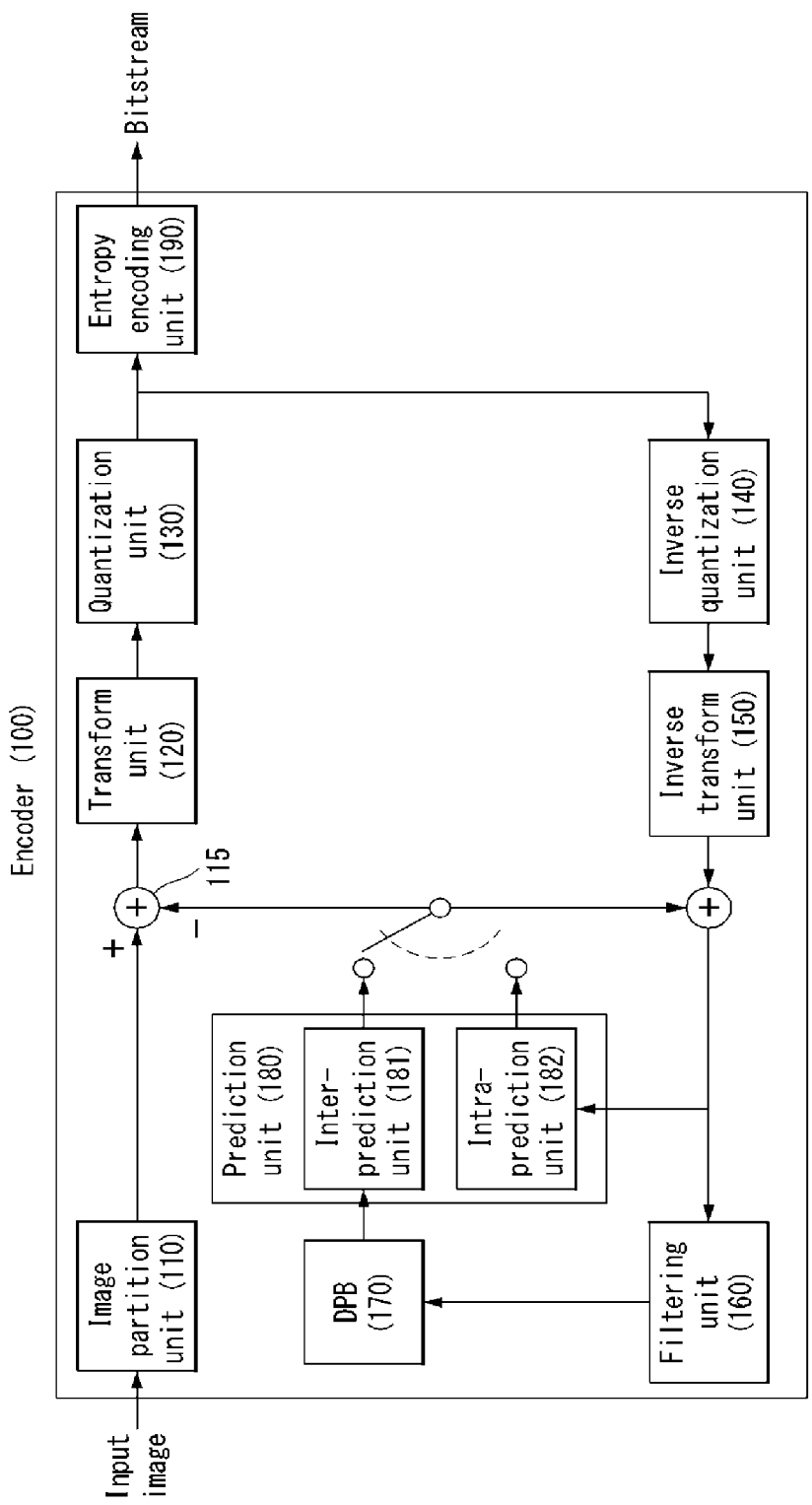
FIG. 1 is an embodiment to which the present invention is applied, and shows a schematic block diagram of an encoder in which the encoding of a still image or moving image signal is performed.

Hereinafter, preferred embodiments of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc., may be properly replaced and interpreted in each coding process.

Hereinafter, in this specification, a "processing unit" means a unit by which an encoding/decoding processing process, such as prediction, transform and/or quantization, is performed. Hereinafter, for convenience of description, a processing unit may also be called a "processing block" or "block."

A processing unit may be construed as a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as a unit for a luma component or a unit for a chroma component. For example, a processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the present invention is not limited thereto, and a processing unit may be construed as a meaning including a unit for a luma component and a unit for a chroma component.

Furthermore, a processing unit is not essentially limited to a block of a square, but may have a polygon form having three or more vertexes.

Furthermore, hereinafter, in this specification, a pixel or pixel element is collected referred to as a sample. Furthermore, using a sample may mean using a pixel value or a pixel element value.

FIG. 1 is an embodiment to which the present invention is applied, and shows a schematic block diagram of an encoder in which the encoding of a still image or moving image signal is performed.

Referring to FIG. 1, an encoder 100 may include a picture split unit 110, a subtraction unit 115, a transform unit 120, a quantization unit 130, a dequantization (inverse-quantization) unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., inter-prediction unit 181 or intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate the transform coefficients by performing transform using a determined transform scheme depending on a prediction mode applied to the residual block and the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequantization and inverse transformation to the quantized signal through the dequantization unit 140 and the inverse transform unit 150, the residual signal may be reconstructed. By adding the reconstructed residual signal to the prediction signal that is outputted from the inter-prediction unit 181 or the intra-prediction unit 182, a reconstructed signal may be generated.

Meanwhile, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy. In this case, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels as a prediction block.

The intra-prediction unit 182 predicts the current block by referring to the samples adjacent the block that is to be encoded currently. The intra-prediction unit 182 may perform the following procedure in order to perform the intra-prediction. First, the intra-prediction unit 182 may prepare a reference sample that is required for generating a prediction signal. Furthermore, the intra-prediction unit 182 may generate a prediction signal by using the reference sample prepared. After, the intra-prediction unit 182 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra-prediction.

In particular, the intra-prediction unit 182 according to the present invention may perform intra-prediction on a current block by linearly interpolating prediction sample values generated based on the intra-prediction mode of the current block. The intra-prediction unit 182 is described in more detail later.

The prediction signal (or prediction block) generated through the inter-prediction unit 181 or the intra-prediction unit 182 may be used to generate a reconstructed signal (or reconstructed block) or may be used to generate a residual signal (or residual block).

Figure 2:
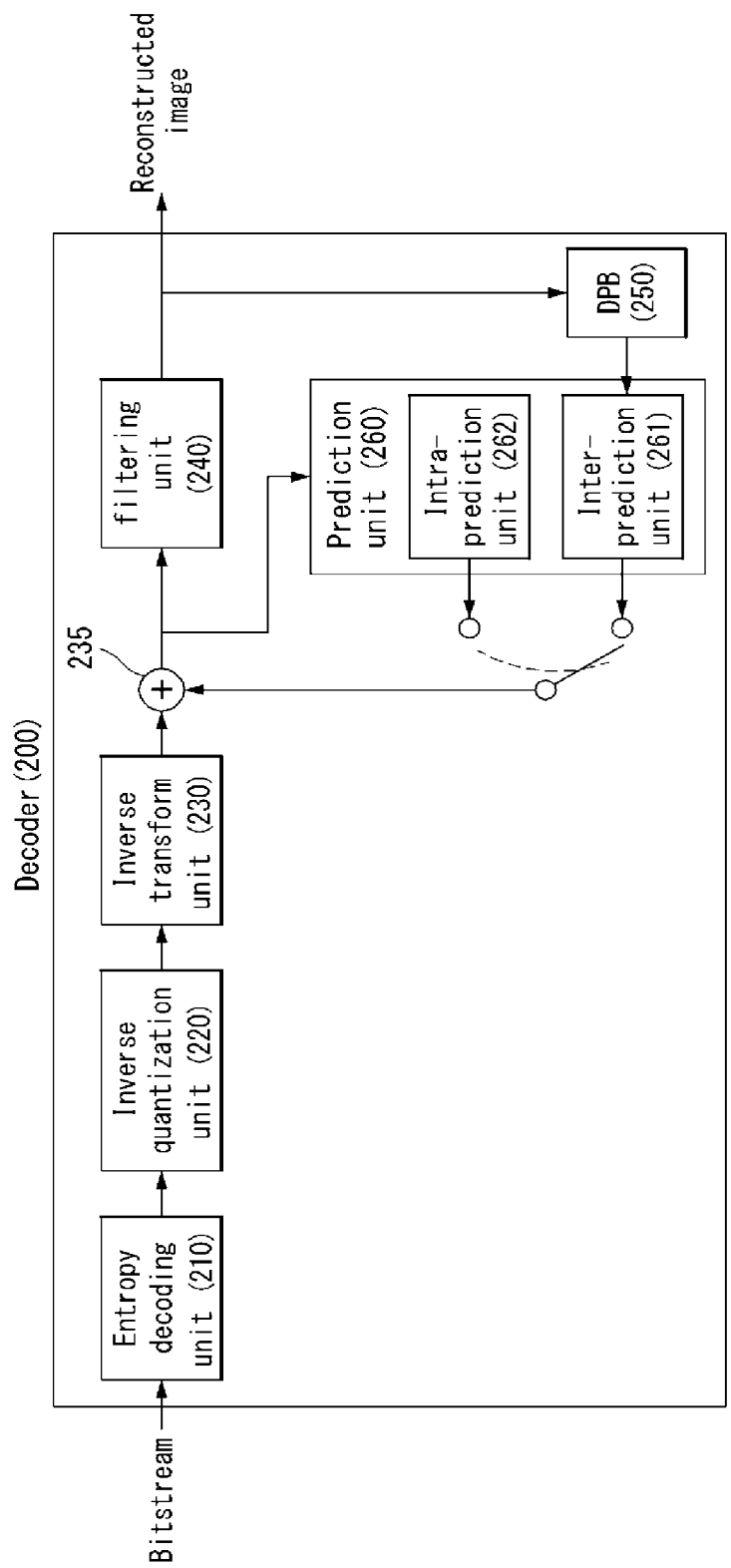
FIG. 2 is an embodiment to which the present invention is applied, and shows a schematic block diagram of a decoder in which the encoding of a still image or moving image signal is performed.

FIG. 2 is an embodiment to which the present invention is applied, and shows a schematic block diagram of a decoder in which the encoding of a still image or moving image signal is performed.

Referring to FIG. 2, a decoder 200 may include an entropy decoding unit 210, a dequantization unit 220, an inverse transform unit 230, an addition unit 235, a filtering unit 240, a decoded picture buffer (DPB) 250 and a prediction unit 260. Furthermore, the prediction unit 260 may include an inter-prediction unit 261 and an intra-prediction unit 262.

Furthermore, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 220 acquires a transform coefficient from the entropy-decoded signal using quantization step size information.

The inverse transform unit 230 obtains a residual signal (or residual block) by inversely transforming transform coefficients using an inverse transform scheme.

The adder 235 adds the obtained residual signal (or residual block) to the prediction signal (or prediction block) output by the prediction unit 260 (i.e., inter-prediction unit 261 or intra-prediction unit 262), thereby generating a reconstructed signal (or reconstructed block).

The filtering unit 240 applies filtering to the reconstructed signal (or reconstructed block) and outputs it to a playback device or transmits it to the decoding picture buffer unit 250. The filtered signal transmitted to the decoding picture buffer unit 250 may be used as a reference picture in the inter-prediction unit 261.

In this specification, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

In particular, the intra-prediction unit 262 according to the present invention may perform intra-prediction on a current block by linearly interpolating prediction sample values generated based on an intra-prediction mode of the current block. The intra-prediction unit 262 is described in detail later.

In general, the block-based image compression method is used in a technique (e.g., HEVC) for compressing a still image or a moving image. A block-based image compression method is a method of processing a video by splitting the video into specific block units, and may decrease the capacity of memory and a computational load.

Figure 3A:
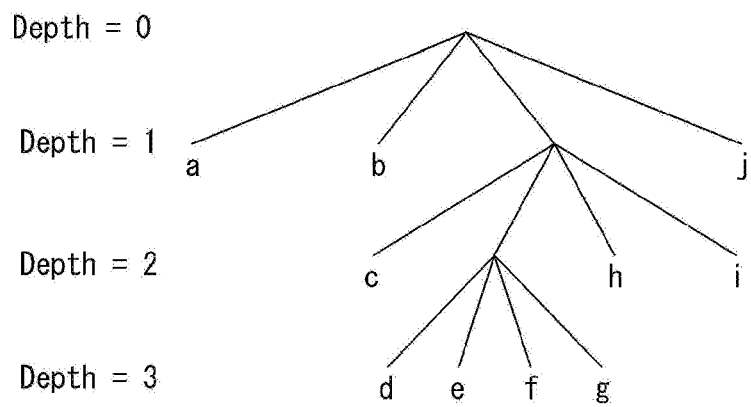
FIGS. 3A and 3B are diagrams for illustrating the split structure of a coding unit to which the present invention may be applied.
Figure 3B:
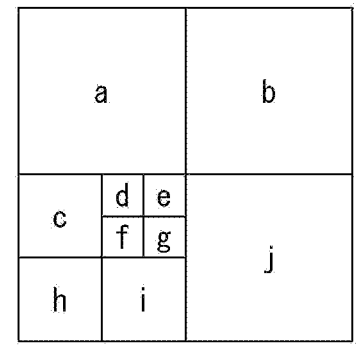

FIGS. 3A and 3B are diagrams for illustrating the split structure of a coding unit that may be applied to the present invention.

The encoder splits a single image (or picture) in a coding tree unit (CTU) of a rectangle form, and sequentially encodes a CTU one by one according to raster scan order.

In HEVC, the size of a CTU may be determined to be one of 64×64, 32×32 and 16×16. The encoder may select and use the size of CTU according to the resolution of an input video or the characteristics of an input video. A CTU includes a coding tree block (CTB) for a luma component and a CTB for two chroma components corresponding to the luma component.

One CTU may be split in a quad-tree structure. That is, one CTU may be split into four units, each having a half horizontal size and half vertical size while having a square form, thereby being capable of generating a coding unit (CU). The split of the quad-tree structure may be recursively performed. That is, a CU is hierarchically from one CTU in a quad-tree structure.

A CU means a basic unit for a processing process of an input video, for example, coding in which intra/inter prediction is performed. A CU includes a coding block (CB) for a luma component and a CB for two chroma components corresponding to the luma component. In HEVC, the size of a CU may be determined to be one of 64×64, 32×32, 16×16 and 8×8.

Referring to FIG. 3A, a root node of a quad-tree is related to a CTU. The quad-tree is split until a leaf node is reached, and the leaf node corresponds to a CU.

This is described in more detail. A CTU corresponds to a root node and has the deepest depth (i.e., depth=0) value. A CTU may not be split depending on the characteristics of an input video. In this case, the CTU corresponds to a CU.

A CTU may be split in a quad-tree form. As a result, lower nodes of a depth 1 (depth=1) are generated. Furthermore, a node (i.e., a leaf node) no longer split from the lower node having the depth of 1 corresponds to a CU. For example, in FIG. 3B, a CU(a), CU(b) and CU(j) corresponding to nodes a, b and j have been once split from a CTU, and have a depth of 1.

At least one of the nodes having the depth of 1 may be split in a quad-tree form again. As a result, lower nodes of a depth 2 (i.e., depth=2) are generated. Furthermore, a node (i.e., leaf node) no longer split from the lower node having the depth of 2 corresponds to a CU. For example, in FIG. 3B, a CU(c), CU(h) and CU(i) corresponding to nodes c, h and i have been twice split from the CTU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from the lower node having the depth of 3 corresponds to a CU. For example, in FIG. 3B, a CU(d), CU(e), CU(f) and CU(g) corresponding to nodes d, e, f and g have been split from the CTU three times, and have a depth of 3.

In the encoder, a maximum size or minimum size of a CU may be determined according to the characteristics of a video image (e.g., resolution) or by considering encoding rate. Furthermore, information about the size or information capable of deriving the size may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents the split count and/or degree of a CU, the depth information may include information about the size of a CU.

Since the LCU is split in a quad-tree form, the size of the SCU may be obtained using the size of the LCU and maximum depth information. Alternatively, the size of the LCU may be obtained using the size of the SCU and maximum depth information of a tree.

For a single CU, information (e.g., a split CU flag (split_cu_flag)) indicating whether the corresponding CU is split may be forwarded to the decoder. The split information is included in all of CUs except the SCU. For example, when the value of the flag indicating whether to split is '1', the corresponding CU is further split into four CUs, and when the value of the flag that represents whether to split is '0', the corresponding CU is not split any more, and the processing process for the corresponding CU may be performed.

As described above, the CU is a basic unit of the coding in which the intra-prediction or the inter-prediction is performed. The HEVC splits the CU in a prediction unit (PU) for coding an input video more effectively.

The PU is a basic unit for generating a prediction block, and even in a single CU, the prediction block may be generated in different way by a unit of a PU. However, the intra-prediction and the inter-prediction are not used together for the PUs that belong to a single CU, and the PUs that belong to a single CU are coded by the same prediction method (i.e., intra-prediction or the inter-prediction).

The PU is not split in the Quad-tree structure, but is split once in a single CU in a predetermined form. This will be described by reference to the drawing below.

Figure 4:
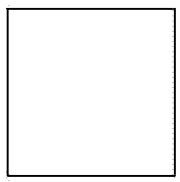
FIG. 4 is a diagram for illustrating a prediction unit to which the present invention may be applied.
Figure 4:
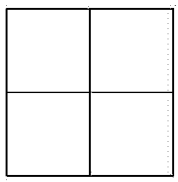
Figure 4:
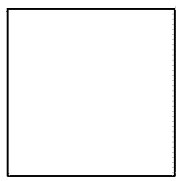
Figure 4:
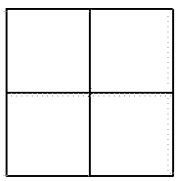
Figure 4:
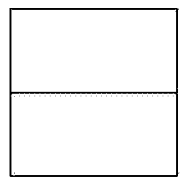
Figure 4:
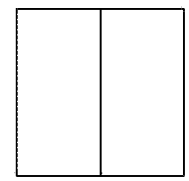
Figure 4:
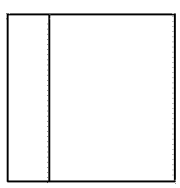
Figure 4:
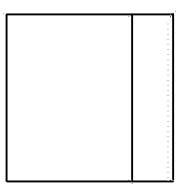
Figure 4:
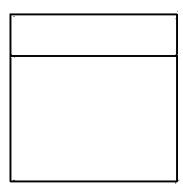
Figure 4:
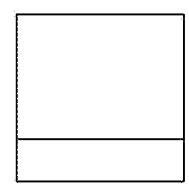

FIG. 4 is a diagram for illustrating a prediction unit that may be applied to the present invention.

A PU is differently split depending on whether the intra-prediction mode is used or the inter-prediction mode is used as the coding mode of the CU to which the PU belongs.

FIG. 4(a) illustrates a PU of the case where the intra-prediction mode is used, and FIG. 4(b) illustrates a PU of the case where the inter-prediction mode is used.

Referring to FIG. 4(a), assuming the case where the size of a single CU is 2N×2N (N=4, 8, 16 and 32), a single CU may be split into two types (i.e., 2N×2N or N×N).

In this case, in the case where a single CU is split into the PU of 2N×2N form, it means that only one PU is existed in a single CU.

In contrast, in the case where a single CU is split into the PU of N×N form, a single CU is split into four PUs, and different prediction blocks are generated for each PU unit. However, such a PU split may be performed only in the case where the size of a CB for the luma component of a CU is a minimum size (i.e., if a CU is the SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in intra-prediction, the PU split of N×N form may be performed only in the case where the size of a CB for the luma component of a CU is a minimum size (i.e., if a CU is the SCU).

Inter-prediction supports the PU split of a 2N×N form in the horizontal direction and an N×2N form in the vertical direction.

In addition, the inter-prediction supports the PU split in the form of nL×2N, nR×2N, 2N×nU and 2N×nD, which is asymmetric motion split (AMP). In this case, 'n' means ¼ value of 2N. However, the AMP may not be used in the case where a CU to which a PU belongs is a CU of minimum size.

In order to efficiently encode an input video in a single CTU, the optimal split structure of a coding unit (CU), prediction unit (PU) and transform unit (TU) may be determined based on a minimum rate-distortion value through the processing process as follows. For example, as for the optimal CU split process in a 64×64 CTU, the rate-distortion cost may be calculated through the split process from a CU of a 64×64 size to a CU of an 8×8 size. A detailed process is as follows.

1) The optimal split structure of a PU and TU that generates a minimum rate distortion value is determined by performing inter/intra-prediction, transformation/quantization, dequantization/inverse transformation and entropy encoding on a CU of a 64×64 size.

2) The optimal split structure of a PU and TU is determined by splitting a 64×64 CU into four CUs of a 32×32 size and generating a minimum rate distortion value for each 32×32 CU.

3) The optimal split structure of a PU and TU is determined by further splitting a 32×32 CU into four CUs of a 16×16 size and generating a minimum rate distortion value for each 16×16 CU.

4) The optimal split structure of a PU and TU is determined by further splitting a 16×16 CU into four CUs of an 8×8 size and generating a minimum rate distortion value for each 8×8 CU.

5) The optimal split structure of a CU in a 16×16 block is determined by comparing the rate-distortion value of the 16×16 CU obtained in the process of 3) with the addition of the rate-distortion value of the four 8×8 CUs obtained in the process of 4). This process is also performed on the remaining three 16×16 CUs in the same manner.

6) The optimal split structure of a CU in a 32×32 block is determined by comparing the rate-distortion value of the 32×32 CU obtained in the process of 2) with the addition of the rate-distortion value of the four 16×16 CUs obtained in the process of 5). This process is also performed on the remaining three 32×32 CUs in the same manner.

7) Lastly, the optimal split structure of a CU in a 64×64 block is determined by comparing the rate-distortion value of the 64×64 CU obtained in the process of 1) with the addition of the rate-distortion value of the four 32×32 CUs obtained in the process of 6).

In an intra-prediction mode, a prediction mode is selected in a PU unit, and prediction and reconstruction are performed on the selected prediction mode in an actual TU unit.

A TU means a basic unit by which actual prediction and reconstruction are performed. A TU includes a transform block (TB) for a luma component and two chroma components corresponding to the luma component.

In the example of FIG. 3A, as if one CTU is split in a quad-tree structure to generate a CU, a TU is hierarchically split from one CU to be coded in a quad-tree structure.

A TU is split in the quad-tree structure, and a TU split from a CU may be split into smaller lower TUs. In HEVC, the size of a TU may be determined to be any one of 32×32, 16×16, 8×8 and 4×4.

Referring back to FIG. 3A, it is assumed that the root node of the quad-tree is related to a CU. The quad-tree is split until a leaf node is reached, and the leaf node corresponds to a TU.

This is described in more detail. A CU corresponds to a root node and has the deepest depth (i.e., depth=0) value. A CU may not be split depending on the characteristics of an input video. In this case, the CU corresponds to a TU.

A CU may be split in a quad-tree form. As a result, lower nodes, that is, a depth 1 (depth=1), are generated. Furthermore, a node (i.e., leaf node) no longer split from the lower node having the depth of 1 corresponds to a TU. For example, in FIG. 3B, a TU(a), TU(b) and TU(j) corresponding to the nodes a, b and j have been once split from a CU, and have a depth of 1.

At least one of the nodes having the depth of 1 may be split again in a quad-tree form. As a result, lower nodes, that is, a depth 2 (i.e., depth=2), are generated. Furthermore, a node (i.e., leaf node) no longer split from the lower node having the depth of 2 corresponds to a TU. For example, in FIG. 3B, a TU(c), TU(h) and TU(i) corresponding to the nodes c, h and i have been split twice from the CU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from a lower node having the depth of 3 corresponds to a CU. For example, in FIG. 3B, a TU(d), TU(e), TU(f), TU(g) corresponding to the nodes d, e, f and g have been split from the CU three times, and have the depth of 3.

A TU having a tree structure may be hierarchically split based on predetermined highest depth information (or highest level information). Furthermore, each split TU may have depth information. The depth information may also include information about the size of the TU because it indicates the number of times and/or degree that the TU has been split.

With respect to one TU, information (e.g., a split TU flag (split_transform_flag)) indicating whether a corresponding TU has been split may be transferred to the decoder. The split information is included in all TUs other than a TU of the least size. For example, if the value of the flag indicating whether a TU has been split is '1', the corresponding TU is split into four TUs. If the value of the flag '0', the corresponding TU is no longer split.

Prediction

In order to reconstruct a current processing unit on which decoding is performed, the decoded part of a current picture including the current processing unit or other pictures may be used.

A picture (slice) using only a current picture for reconstruction, that is, performing only intra-prediction, may be referred to as an intra-picture or I picture (slice). A picture (slice) using the greatest one motion vector and reference index in order to predict each unit may be referred to as a predictive picture or P picture (slice). A picture (slice) using a maximum of two motion vectors and reference indices in order to predict each unit may be referred to as a bi-predictive picture or B picture (slice).

Intra-prediction means a prediction method of deriving a current processing block from a data element (e.g., sample value, etc.) of the same decoded picture (or slice). That is, intra-prediction means a method of predicting a pixel value of the current processing block with reference to reconstructed regions within a current picture.

Inter-prediction means a prediction method of deriving a current processing block based on a data element (e.g., sample value or motion vector) of a picture other than a current picture. That is, inter-prediction means a method of predicting the pixel value of the current processing block with reference to reconstructed regions within another reconstructed picture other than a current picture.

Hereinafter, intra-prediction is described in more detail.

Intra-Prediction

Figure 5:
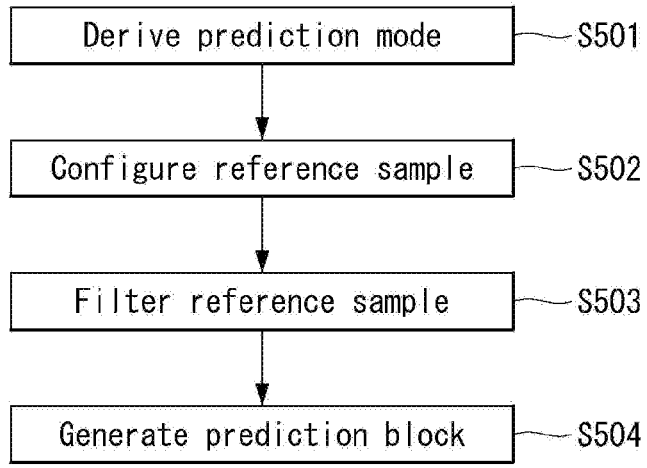
FIG. 5 is an embodiment to which the present invention is applied and is a diagram illustrating an intra-prediction method.

FIG. 5 is an embodiment to which the present invention is applied and is a diagram illustrating an intra-prediction method.

Referring to FIG. 5, the decoder derives an intra-prediction mode of a current processing block (S501).

In intra-prediction, there may be a prediction direction for the location of a reference sample used for prediction depending on a prediction mode. An intra-prediction mode having a prediction direction is referred to as intra-angular prediction mode "Intra_Angular prediction mode." In contrast, an intra-prediction mode not having a prediction direction includes an intra-planar (INTRA_PLANAR) prediction mode and an intra-DC (INTRA_DC) prediction mode.

Figure 6:
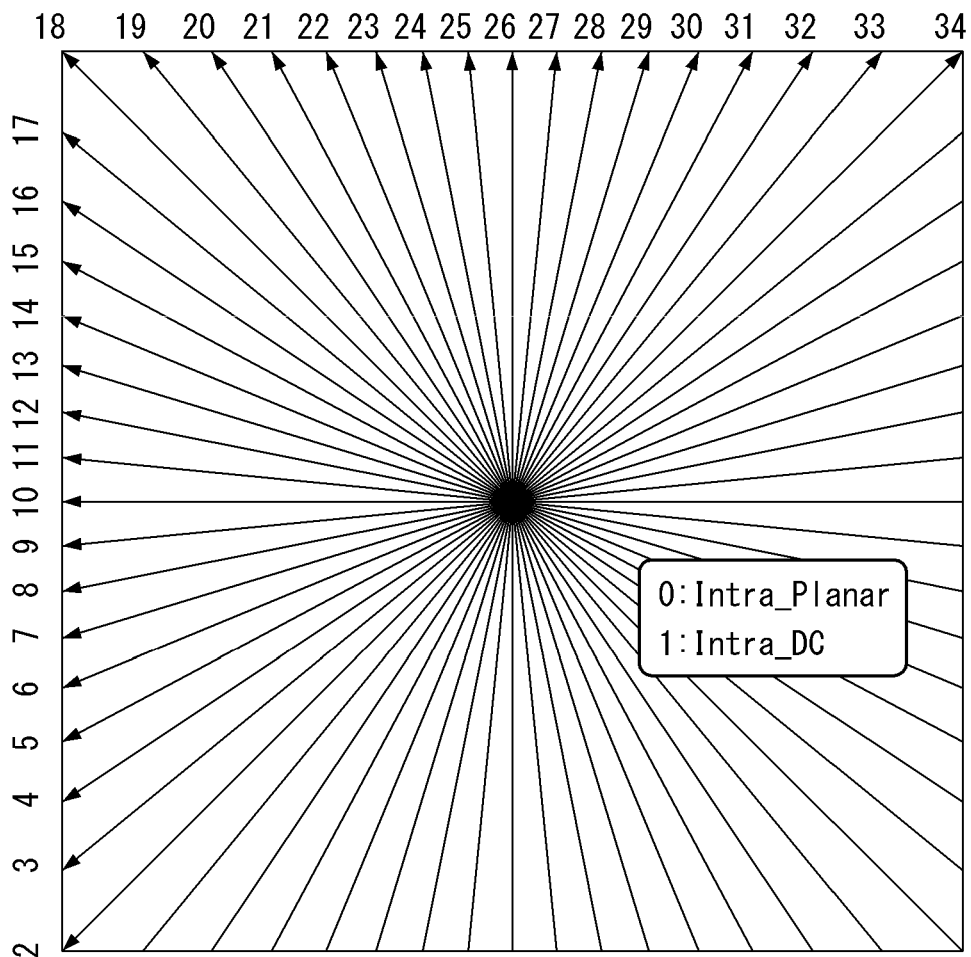
FIG. 6 illustrates prediction directions according to intra-prediction modes.

Table 1 illustrates intra-prediction modes and associated names, and FIG. 6 illustrates prediction directions according to intra-prediction modes.

TABLE 1

| INTRA PREDICTION MODE | ASSOCIATED NAMES |
|---|---|
| 0 | INTRA_PLANAR |
| 1 | INTRA_DC |
| 2 ... 34 | INTRA_ANGULAR2 ... INTRA_ANGULAR34 |

In intra-prediction, prediction may be on a current processing block based on a derived prediction mode. A reference sample used for prediction and a detailed prediction method are different depending on a prediction mode. Accordingly, if a current block is encoded in an intra-prediction mode, the decoder derives the prediction mode of a current block in order to perform prediction.

The decoder checks whether neighboring samples of the current processing block may be used for prediction and configures reference samples to be used for prediction (S502).

In intra-prediction, neighboring samples of a current processing block mean a sample neighboring the left boundary of the current processing block of an nS×nS size, a total of 2×nS samples neighboring the left bottom of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been decoded or may not be available. In this case, the decoder may configure reference samples to be used for prediction by substituting unavailable samples with available samples.

The decoder may perform the filtering of the reference samples based on the intra-prediction mode (S503).

Whether the filtering of the reference samples will be performed may be determined based on the size of the current processing block. Furthermore, a method of filtering the reference samples may be determined by a filtering flag transferred by the encoder.

The decoder generates a prediction block for the current processing block based on the intra-prediction mode and the reference samples (S504). That is, the decoder generates the prediction block for the current processing block (i.e., generates a prediction sample) based on the intra-prediction mode derived in the intra-prediction mode derivation step S501 and the reference samples obtained through the reference sample configuration step S502 and the reference sample filtering step S503.

If the current processing block has been encoded in the INTRA_DC mode, in order to minimize the discontinuity of the boundary between processing blocks, at step S504, the left boundary sample of the prediction block (i.e., a sample within the prediction block neighboring the left boundary) and the top boundary sample (i.e., a sample within the prediction block neighboring the top boundary) may be filter.

Furthermore, at step S504, in the vertical mode and horizontal mode of the intra-angular prediction modes, as in the INTRA_DC mode, filtering may be applied to the left boundary sample or the top boundary sample.

This is described in more detail. If the current processing block has been encoded in the vertical mode or the horizontal mode, the value of a prediction sample may be derived based on a reference sample located in a prediction direction. In this case, a boundary sample that belongs to the left boundary sample or top boundary sample of the prediction block and that is not located in the prediction direction may neighbor a reference sample not used for prediction. That is, the distance from the reference sample not used for prediction may be much closer than the distance from the reference sample used for prediction.

Accordingly, the decoder may adaptively apply filtering on left boundary samples or top boundary samples depending on whether an intra-prediction direction is a vertical direction or a horizontal direction. That is, the decoder may apply filtering on the left boundary samples if the intra-prediction direction is the vertical direction, and may apply filtering on the top boundary samples if the intra-prediction direction is the horizontal direction.

As described above, in HEVC, for intra-frame prediction, the prediction block of a current block is generated using 33 types of angular prediction methods and 2 types of non-angular prediction methods, that is, a total of 35 types of prediction methods.

In this case, in the existing intra-prediction method, a prediction sample for a current block value is generated using neighboring samples (a sample neighboring the top of a current block and a sample neighboring the left of the current block). After the prediction sample value is generated, the generated prediction sample value is duplicated depending on the direction of the intra-prediction mode of the current block.

In encoding/decoding according to the intra-prediction mode, there is a problem in that the accuracy of prediction is reduced as the distance from reference samples becomes distant because the generated prediction sample value is simply duplicated. That is, if the distance between the reference samples used for prediction and the prediction sample is close, prediction accuracy is high. If the distance between the reference samples used for prediction and the prediction sample is distant, prediction accuracy is low.

In order to solve such a problem, the present invention proposes a method of generating a prediction sample for a current block by deriving a plurality of prediction sample values using samples neighboring in intra-prediction and linearly interpolating the derived prediction sample values.

In particular, the present invention proposes a linear interpolation intra-prediction method according to the direction and angle of an intra-prediction mode. Furthermore, the present invention proposes a linear interpolation intra-prediction method that applies weight according to the distance between a current sample and prediction samples.

Hereinafter, neighboring samples of the present invention proposed by this specification may mean samples available for intra-prediction.

Hereinafter, in the description of the present invention, for convenience of description, a neighboring sample is assumed and described as follows, but the present invention is not limited thereto.

Neighboring samples may mean a sample neighboring the left boundary of a current block of an nS×nS size and a total of 2×nS samples neighboring the bottom left of the current block, a sample neighboring the top boundary of the current block and a total of 2×nS samples neighboring the top right of the current block, and one sample neighboring the top left of the current block.

Furthermore, the neighboring samples may mean samples further including nS samples neighboring the right boundary of the current block, nS samples neighboring the bottom boundary of the current block and one sample neighboring the bottom right of the current block in addition to the samples.

Furthermore, in the description of the present invention, for convenience of description, a sample neighboring the top right and a sample neighboring the bottom left are assumed and described as follows, but the present invention is not limited thereto.

Assuming that the horizontal and vertical coordinates of the top left samples of a current block are [0,0], samples neighboring the top right of the current block may mean nS samples located in [nS,−1]~[2*nS−1,−1]. Furthermore, a sample neighboring the bottom left of the current block may mean nS samples located in [−1, nS]~[−1, 2*nS−1].

In the linear interpolation intra-prediction method, a prediction sample for a current block may be generated by deriving a value of a first prediction sample and a value of a second prediction sample using the neighboring samples of the current block and linearly interpolating the derived values of the first prediction sample and the second prediction sample.

After an intra-prediction mode is divided for each region, one reference sample may be determined to be a reference sample for linear interpolation for each block, thereby being capable of deriving a value of a second prediction sample.

The value of the second prediction sample may be derived from neighboring samples as a value of one reference sample or a value obtained by linearly interpolating two reference samples. In this case, the value of the second prediction sample may be derived in the unit of samples depending on the direction and angle of an intra-prediction mode.

First, a linear interpolation intra-prediction method will be described. In the linear interpolation intra-prediction method, the intra-prediction mode is divided for each region, and one reference sample is determined as a reference sample for linear interpolation in the unit of blocks, and a value of second prediction sample is derived as the determined reference sample value. This method will be described in detail below.

The encoder/decoder may generate the prediction sample of a current block by deriving a value of a first prediction sample and a value of a second prediction sample and linearly interpolating the derived values of the first prediction sample value and second prediction sample.

The value of the first prediction sample may be derived using the methods described in FIGS. 5 and 6. That is, the encoder/decoder may derive the intra-prediction mode of a current block, may check whether the neighboring samples of the current block may be used for prediction, and may configure reference samples used for prediction.

In this case, for example, in the case of HEVC, the neighboring samples of a current block may mean a sample neighboring the left boundary of a current processing block of an nS×nS size and a total of 2×nS samples neighboring the bottom left of the current processing block, a sample neighboring the top boundary of the current processing block and a total of 2×nS samples neighboring the top right of the current processing block, and one sample neighboring the top left of the current processing block.

If some of the neighboring samples of a current block have not yet been decoded or are not available, the encoder/decoder may configure reference samples to be used for prediction by substituting unavailable samples with available samples and may perform the filtering of the reference samples based on an intra-prediction mode.

The encoder/decoder may derive a value of a first prediction sample using an intra-prediction mode and reference samples.

The encoder/decoder may determine a reference sample for linear interpolation depending on the direction and angle of an intra-prediction mode and determine a value of a second prediction sample based on the determined reference sample value. A method of determining a reference sample for linear interpolation is described below with reference to FIGS. 7 and 8.

Figure 7A:
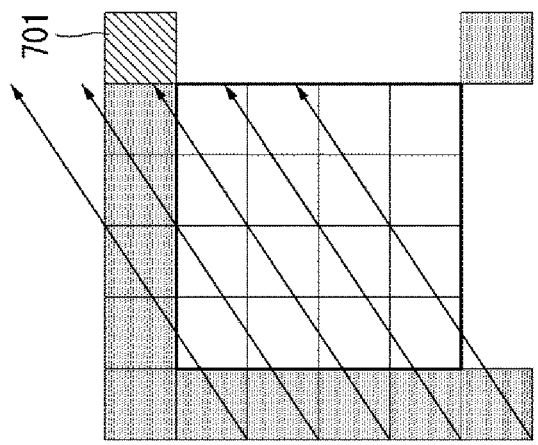
FIGS. 7A-7C are diagrams for illustrating a linear interpolation prediction method as an embodiment to which the present invention may be applied.
Figure 7B:
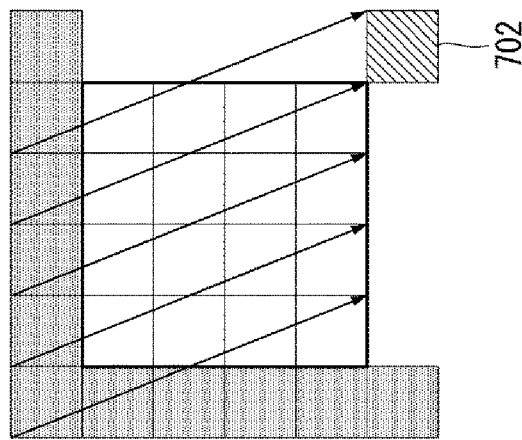
Figure 7C:
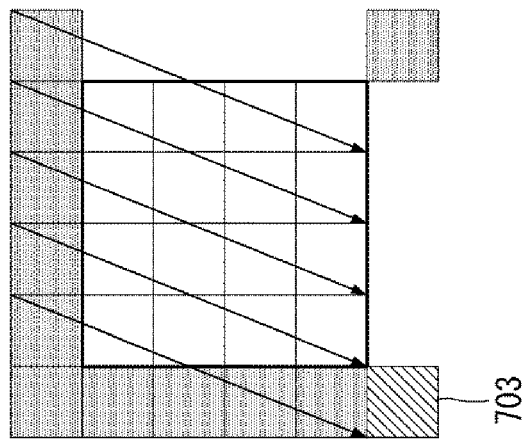

FIGS. 7A-7C are diagrams for illustrating a linear interpolation prediction method as an embodiment to which the present invention may be applied.

The encoder/decoder may determine different reference samples to be reference samples for linear interpolation depending on the direction and angle of an intra-prediction mode. Furthermore, the encoder/decoder may use the determined reference sample values for linear interpolation as a value of a second prediction sample. In the case of FIG. 7A, a top right sample 701 neighboring a current block may be determined to be a reference sample for linear interpolation.

That is, in the case of FIG. 7A, the encoder/decoder may generate the prediction sample value of a current sample by linearly interpolating a value of a first prediction sample and the value of the top right sample 701 neighboring the current block. The encoder/decoder may generate the prediction block of the current block by applying the same method to each of all of samples within the current block.

In the case of FIG. 7B, a bottom right sample 702 neighboring a current block may be determined to be a reference sample for linear interpolation. In this case, the encoder/decoder may generate the prediction sample value of a current sample by linearly interpolating a value of a first prediction sample and the value of the bottom right sample 702 neighboring the current block. The encoder/decoder may generate the prediction block of the current block by applying the same method to each of all of samples within the current block.

In the case of FIG. 7C, a bottom left sample 703 neighboring a current block may be determined to be a reference sample for linear interpolation. In this case, the encoder/decoder may generate the prediction sample value of a current sample by linearly interpolating a value of a first prediction sample and the value of the bottom left sample 703 neighboring the current block. The encoder/decoder may generate the prediction block of the current block by applying the same method to each of all of samples within the current block.

That is, the top right sample 701, the bottom right sample 702 or the bottom left sample 703 neighboring the current block may be determined to be a reference sample for linear interpolation depending on the direction and angle of an intra-prediction mode. The determined reference sample value may be derived as the value of a second prediction sample.

As described above, a value of a second prediction sample may be derived using different reference samples depending on the direction and angle of an intra-prediction mode. The classification of the direction and angle is described below with reference to the following figure.

Figure 8:
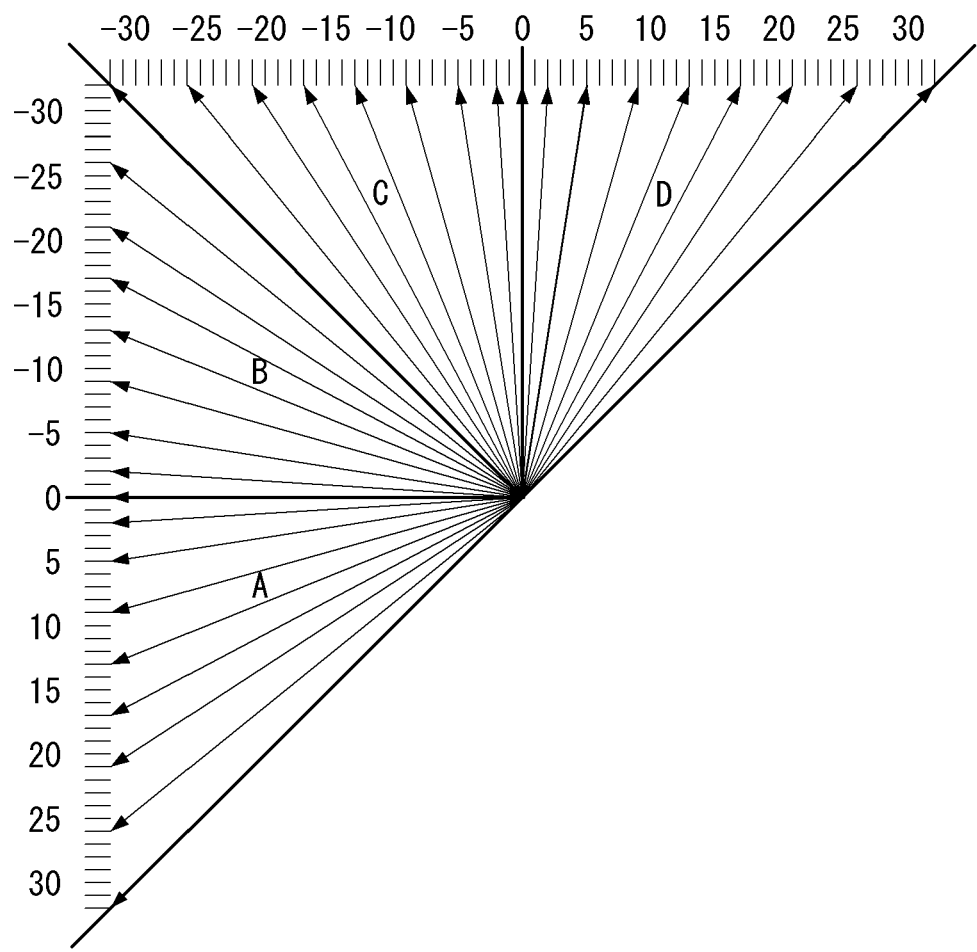
FIG. 8 illustrates the classification of regions according to the direction and angle of an intra-prediction mode.

FIG. 8 illustrates the classification of regions according to the direction and angle of an intra-prediction mode.

Referring to FIG. 8, a region having a horizontal direction may be classified as a region A, B, and a region having a vertical direction may be classified as a region C, D. Furthermore, a positive angular region may be classified as the region A, D, and a negative angular region may be classified as the region B, C based on the angle. Table 2 is a table that lists the classification of regions according to the direction and angle of a prediction mode.

TABLE 2

| Region | Direction | Angle |
|---|---|---|
| A | horizontal | positive |
| B | horizontal | negative |
| C | vertical | negative |
| D | vertical | positive |

That is, the region A is a case where the direction of an intra-prediction mode is a horizontal direction and belongs to the region of a positive angle direction. The region B is a case where the direction of an intra-prediction mode is a horizontal direction belongs to the region of a negative angle direction. The region C is a case where the direction of an intra-prediction mode is a vertical direction and belongs to the region of a negative angle direction. The region D is a case where the direction of an intra-prediction mode is a vertical direction and belongs to the region of a positive angle direction.

Referring to FIGS. 7A-7C, FIG. 7A may correspond to a case where the direction of an intra-prediction mode belongs to the region A, FIG. 7B may correspond to a case where the direction of an intra-prediction mode belongs to the region B, C, and FIG. 7C may correspond to a case where the direction of an intra-prediction mode belongs to the region D.

That is, if the direction of an intra-prediction mode belongs to the region A (the region of the horizontal direction and positive angle direction), the value of the top right sample 701 neighboring the current block may be derived as a value of a second prediction sample.

If the direction of an intra-prediction mode belongs to the region B (the region of the horizontal direction and negative angle direction) or the region C (the region of the vertical direction and negative angle direction), the value of the bottom right sample 702 neighboring the current block may be derived as a value of a second prediction sample.

If the direction of an intra-prediction mode belongs to the region D (the region of the vertical direction and positive angle direction), the value of the bottom left sample 703 neighboring the current block may be derived as a value of a second prediction sample.

In the case of a horizontal mode, the value of the top right sample 701 neighboring the current block may be derived as a value of the second prediction sample, or the value of the bottom right sample 702 neighboring the current block may be derived as the value of the second prediction sample. Furthermore, a value (or averaged value) obtained by linearly interpolating the top right sample 701 and the bottom right sample 702 may be derived as the value of the second prediction sample.

In the case of a vertical mode, the value of the bottom left sample 703 neighboring the current block may be derived as a value of a second prediction sample, or the value of the bottom right sample 702 neighboring the current block may be derived as the value of the second prediction sample. Furthermore, a value (or averaged value) obtained by linearly interpolating the bottom left sample 703 and the bottom right sample 702 may be derived as a value of the second prediction sample.

If the direction of an intra-prediction mode belongs to the region B, C, the value of a bottom right sample neighboring a current block may be derived as a value of a second prediction sample. In this case, the encoder/decoder may generate the bottom right sample so as to derive the value of the second prediction sample. A method of generating the bottom right sample (or bottom right reference sample) is described with reference to the following drawing.

Figure 9B:
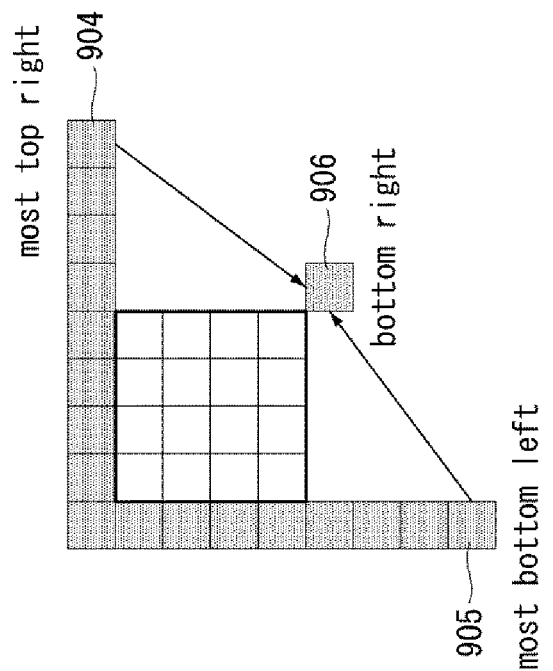
FIGS. 9A and 9B are diagrams illustrating a method of generating a bottom right sample according to an embodiment to which the present invention.
Figure 9A:
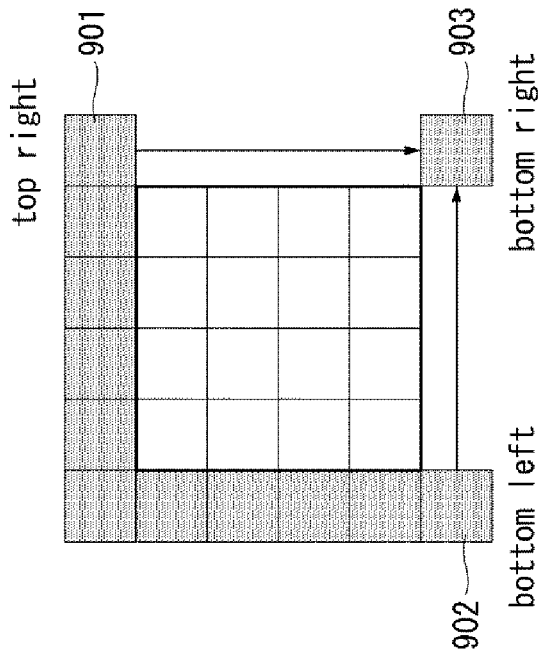

FIGS. 9A and 9B are diagrams illustrating a method of generating a bottom right sample according to an embodiment to which the present invention.

Referring to FIG. 9A, a bottom right sample 903 neighboring a current block may be generated using a top right sample 901 neighboring the current block and a bottom left sample 902 neighboring the current block.

For example, the value of the bottom right sample 903 may be generated as an average value of the value of the top right sample 901 and the value of the bottom left sample 902. In this case, the bottom right sample 903 may be generated using Equation 1.

Bottom right sample=(top right sample+bottom left sample+1)>>1  [Equation 1]

Referring to FIG. 9B, a bottom right sample 906 neighboring a current block may be generated using a sample 904 that belongs to samples neighboring the top right of the current block and that is located on the most right side (hereinafter referred to as the most top right sample) (e.g., a sample spaced twice the length of the current block in the horizontal direction based on a sample neighboring the top left of the current block, that is, a [2*nS−1,−1] sample in an nS×nS block) and a sample 905 that belongs to samples neighboring the bottom left of the current block and that is located on the lowest side (hereinafter referred to as the most bottom left sample) (e.g., a sample spaced twice the length of the current block in the vertical direction based on a sample neighboring the top left of the current block, that is, a [−1,2*nS−1] sample in the nS×nS block).

For example, an average value of the value of the most top right sample 904 and the value of most bottom left sample 905 may be generated as the value of the bottom right sample 906. In this case, the bottom right sample 906 may be generated using Equation 2.

Bottom right sample=(most top right sample+most bottom left sample+1)>>1  [Equation 2]

In FIGS. 9A and 9B, a method of generating a bottom right sample using neighboring samples belonging to reconstructed video on which encoding/decoding have already been performed has been described. A method directly using the sample value of the original video is described below with reference to the following drawing.

Figure 10:
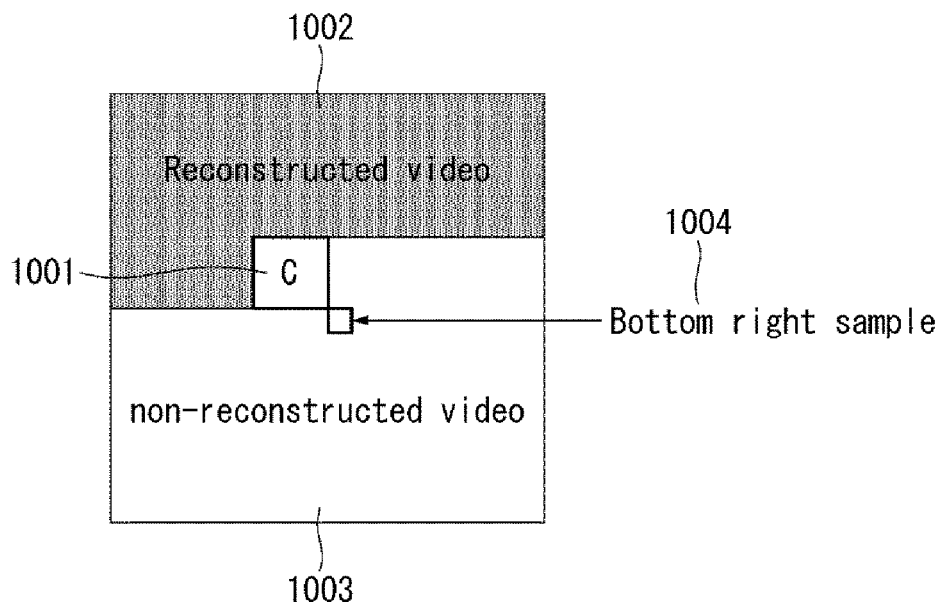
FIG. 10 is a diagram illustrating a method of generating a bottom right sample according to an embodiment to which the present invention.

FIG. 10 is a diagram illustrating a method of generating a bottom right sample according to an embodiment to which the present invention.

Referring to FIG. 10, for example, if encoding/decoding is performed in a raster scan order, encoding/decoding is performed based on a current block C 1001, and a part may be divided into a reconstructed video part 1002 and a part on which encoding/decoding has not yet been performed (or unconstructed vide part) 1003. That is, the unconstructed vide part 1003, that is, the right-side and lower part of the current block C 1001, may correspond to a part on which encoding/decoding has not yet been performed.

The decoder cannot directly use the value of a bottom right sample 1004 because the bottom right sample 1004 neighboring the current block C 1001 corresponds to a part that has not yet been reconstructed.

In this case, the encoder may transmit a sample value corresponding to the bottom right sample 1004 adjacent to the current block C 1001 in the original video to the decoder. The decoder may receive the sample value and use the value of the bottom right sample 1004 of the original video without any change.

That is, the encoder may perform encoding using the value of the bottom right sample 1004 of the original video, and the decoder may perform decoding using the received value of the bottom right sample 1004 without any change.

The accuracy of prediction and compression performance can be improved because the encoder/decoder using the sample value of the original video without any change.

A method of deriving a value of a first prediction sample and a value of the second prediction sample and a method of generating a bottom right sample have been described above.

A method of generating the value of the prediction sample (or final prediction sample) of a current block by linearly interpolating a value of a first prediction sample and a value of a second prediction sample is described below with reference to the following drawing.

Figure 11:
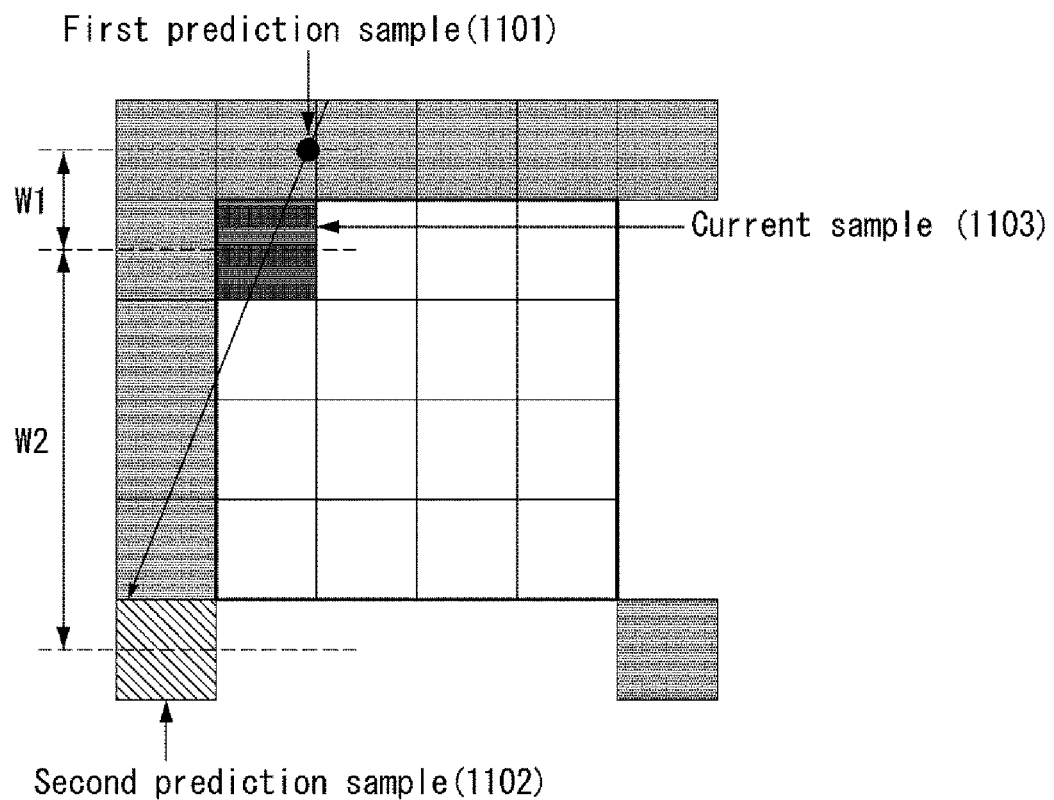
FIG. 11 is a diagram for illustrating a linear interpolation prediction method as an embodiment to which the present invention is applied.

FIG. 11 is a diagram for illustrating a linear interpolation prediction method as an embodiment to which the present invention is applied.

In FIG. 11, for convenience of description, a case where the direction of an intra-prediction mode of a current block belongs to the region (i.e., region D in FIG. 8) of the vertical direction and positive angle direction is described as an example.

The encoder/decoder may derive the intra-prediction mode of a current block, may check whether neighboring samples are available, and may configure reference samples used for prediction. The encoder/decoder may derive the value of a first prediction sample 1101 using the derived intra-prediction mode and the reference samples.

As described above, if the direction of the intra-prediction mode of a current block belongs to the region of a vertical direction and a positive angle direction, the value of a second prediction sample 1102 may be determined to be the value of a bottom left sample neighboring the current block.

The encoder/decoder may generate the prediction sample (or final prediction sample) of a current sample 1103 by linearly interpolating the value of the first prediction sample 1101 and the value of the second prediction sample 1102. In this case, the value of the prediction sample (or final prediction sample) of the current sample 1103 may be calculated as in Equation 3.

$$\text{Prediction sample value of current sample} = ((w_2 * \text{first prediction sample value}) + (w_1 * \text{second prediction sample value}) + (w_1 + w_2)/2)/(w_1 + w_2) \quad \text{[Equation 3]}$$

In Equation 3, $w_1$ may be calculated as the vertical distance between the first prediction sample 1101 and the current sample 1103, and $w_2$ may be calculated as the vertical distance between the second prediction sample 1102 and the current sample 1103. That is, the encoder/decoder may generate the prediction sample of the current sample 1103 by performing linear interpolation by applying a weight value according to a vertical distance ratio to the value of the first prediction sample 1101 and the value of the second prediction sample 1102.

The encoder/decoder may generate the prediction block of a current block by applying the same method to all of samples within the current block.

The prediction sample value of a current sample may be calculated using Equation 3 with respect to a direction other than the directions of an intra-prediction mode illustrated in FIG. 11.

That is, in all of intra-prediction modes having directions (e.g., in intra-prediction modes having 33 directions in HEVC), the encoder/decoder may generate the prediction sample of a current sample by applying weight values according to a vertical distance between a first prediction sample and the current sample and a vertical distance between a second prediction sample and the current sample and linearly interpolating them. In this case, the prediction sample value of the current sample may be calculated using Equation 3. The encoder/decoder may generate the prediction block of a current block by applying the same method to all of samples within the current block.

The linear interpolation intra-prediction method of determining a reference sample for linear interpolation and deriving the determined reference sample value as a value of the second prediction sample has been described above. Hereinafter, a linear interpolation intra-prediction method of deriving a value of the second prediction sample as a value of one reference sample of neighboring samples or deriving a value of the second prediction sample as a value obtained by linearly interpolating two reference samples is described below. In this linear interpolation intra-prediction method, a value of the second prediction sample is derived depending on the direction of the intra-prediction mode.

The encoder/decoder may generate the prediction sample of a current block by deriving a value of a first prediction sample and a value of a second prediction sample and linearly interpolating the derived values of the first prediction sample and second prediction sample.

First, the value of the first prediction sample may be derived using the methods described in FIGS. 5 and 6. That is, the encoder/decoder may derive the intra-prediction mode of a current block, may check whether the neighboring samples of the current block can be used for prediction, and may configure reference samples to be used for prediction.

In this case, for example, in the case of HEVC, the neighboring samples of a current block may mean a sample neighboring the left boundary of a current processing block of an nS×nS size, a total of 2×nS samples neighboring the bottom left of the current processing block, a sample neighboring the top boundary of the current processing block, a total of 2×nS samples neighboring the top right of the current processing block, and one sample neighboring the top left of the current processing block.

If some of the neighboring samples of a current block have not yet been decoded or are not available, the decoder may configure reference samples to be used for prediction by substituting unavailable samples with available samples and may perform the filtering of the reference samples based on an intra-prediction mode.

The encoder/decoder may derive a value of a first prediction sample using the intra-prediction mode and the reference samples.

A value of the second prediction sample may be derived as one reference sample value of neighboring samples of a current block or a value obtained by linearly interpolating two reference samples depending on the direction of an intra-prediction mode.

In this case, for example, in the case of HEVC, the neighboring samples of a current block may mean a sample neighboring the left boundary of a current block of an nS×nS size and a total of 2×nS samples neighboring the bottom left of the current block, a sample neighboring the top boundary of the current block and a total of 2×nS samples neighboring the top right of the current block, and one sample neighboring the top left of the current block, nS samples neighboring the right boundary of the current block, nS samples neighboring the bottom boundary of the current block and/or one sample neighboring the bottom right of the current block.

A method of generating a right sample (or right reference sample) neighboring the right of a current block or a bottom sample (or bottom reference sample) neighboring the bottom of the current block is described with reference to the following drawing.

Figure 12:
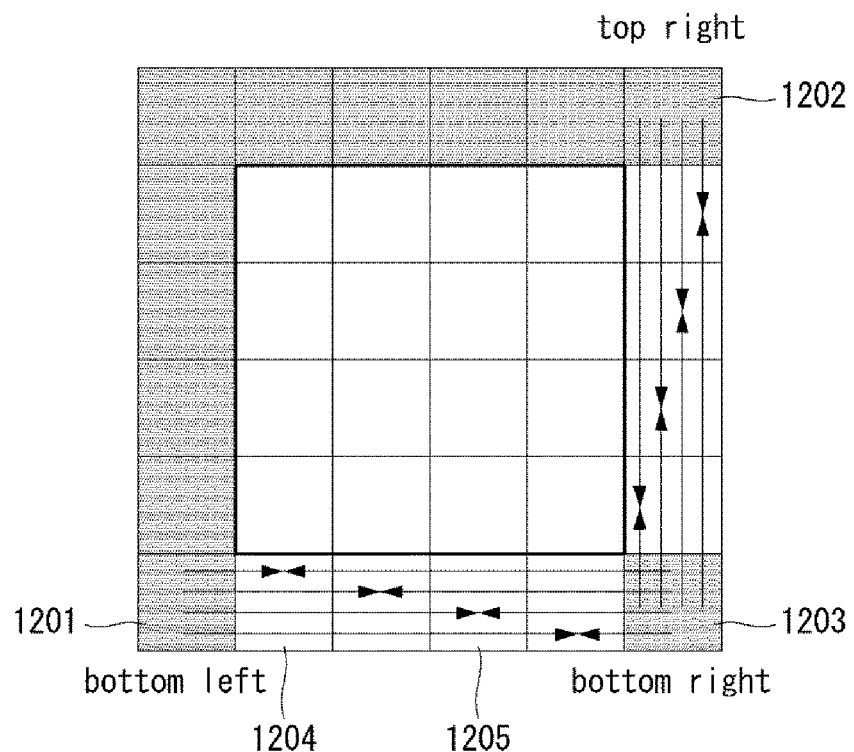
FIG. 12 is a diagram for illustrating a method of generating a bottom sample and a right sample according to an embodiment to which the present invention.

FIG. 12 is a diagram for illustrating a method of generating a bottom sample and a right sample according to an embodiment to which the present invention.

Referring to FIG. 12, the encoder/decoder may generate a bottom right sample 1203 neighboring a current block.

The bottom right sample 1203 neighboring the current block may be generated using the methods described in FIGS. 9 and 10.

The bottom sample neighboring the bottom of the current block may be generated by linearly interpolating a bottom left sample 1201 and bottom right sample 1203 neighboring the current block, and the right sample neighboring the right of the current block may be generated by linearly interpolating a top right sample 1202 and the bottom right sample 1203 neighboring the current block.

For example, the encoder/decoder may generate the left first sample 1204 of bottom samples by applying weight according to a distance ratio to the bottom left sample 1201 and the bottom right sample 1203 and linearly interpolating them. That is, the ratio of the weight applied to the bottom left sample 1201 and the weight applied to the bottom right sample 1203 may be calculated as 4:1 depending on the distance between the left first sample 1204 and bottom left sample 1201 of the bottom samples and the distance between the left first sample 1204 and bottom right sample 1203 of the bottom sample.

Furthermore, for example, in the case of the left third sample 1205 of the bottom samples, the ratio of weight applied to the bottom left sample 1201 and weight applied to the bottom right sample 1203 may be determined to be 2:3 depending on the distance between the left third sample 1205 and bottom left sample 1201 of the bottom samples and the distance between the left third sample 1205 and bottom right sample 1203 of the bottom samples.

That is, the encoder/decoder may generate a bottom sample by applying and linearly interpolating weight according to a distance ratio between the bottom left sample 1201 and the bottom right sample 1203, and may generate a right sample by applying and linearly interpolating weight according to a distance ratio between the top right sample 1202 and the bottom right sample 1203.

The aforementioned method of generating a bottom sample and a right sample is one embodiment, and the present invention is not essentially limited thereto. That is, the encoder/decoder may configure a bottom sample and a right sample without first generating the bottom right sample 1203, and may configure a bottom sample and a right sample based on an average value of the bottom left sample 1201 and the bottom right sample 1203 or an average value of the top right sample 1202 and the bottom right sample 1203.

The encoder/decoder may derive a right sample and bottom sample of a current block, and may derive a value of a first prediction sample and value of a second prediction sample based on the intra-prediction mode of the current block. This is described below with reference to the following drawing.

Figure 13:
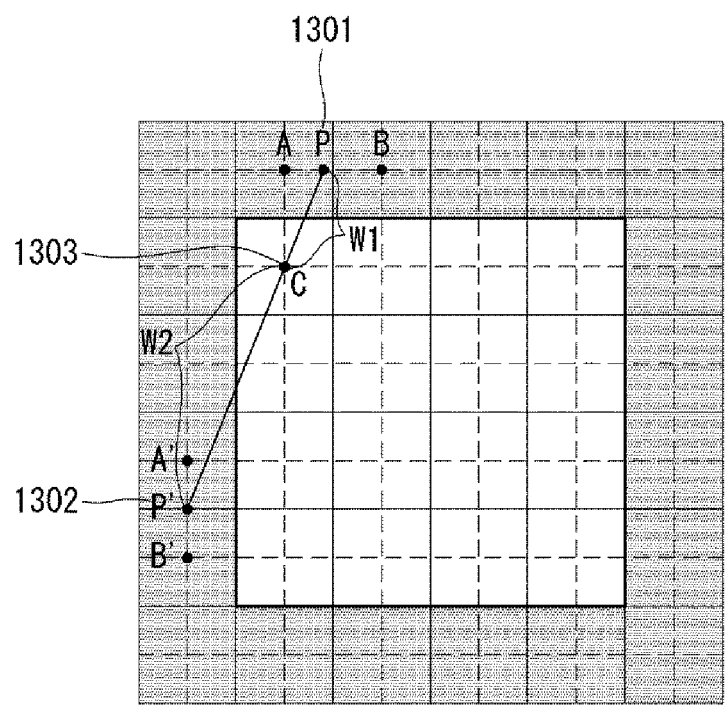
FIG. 13 is a diagram for illustrating a linear interpolation prediction method as an embodiment to which the present invention is applied.
Figure 14:
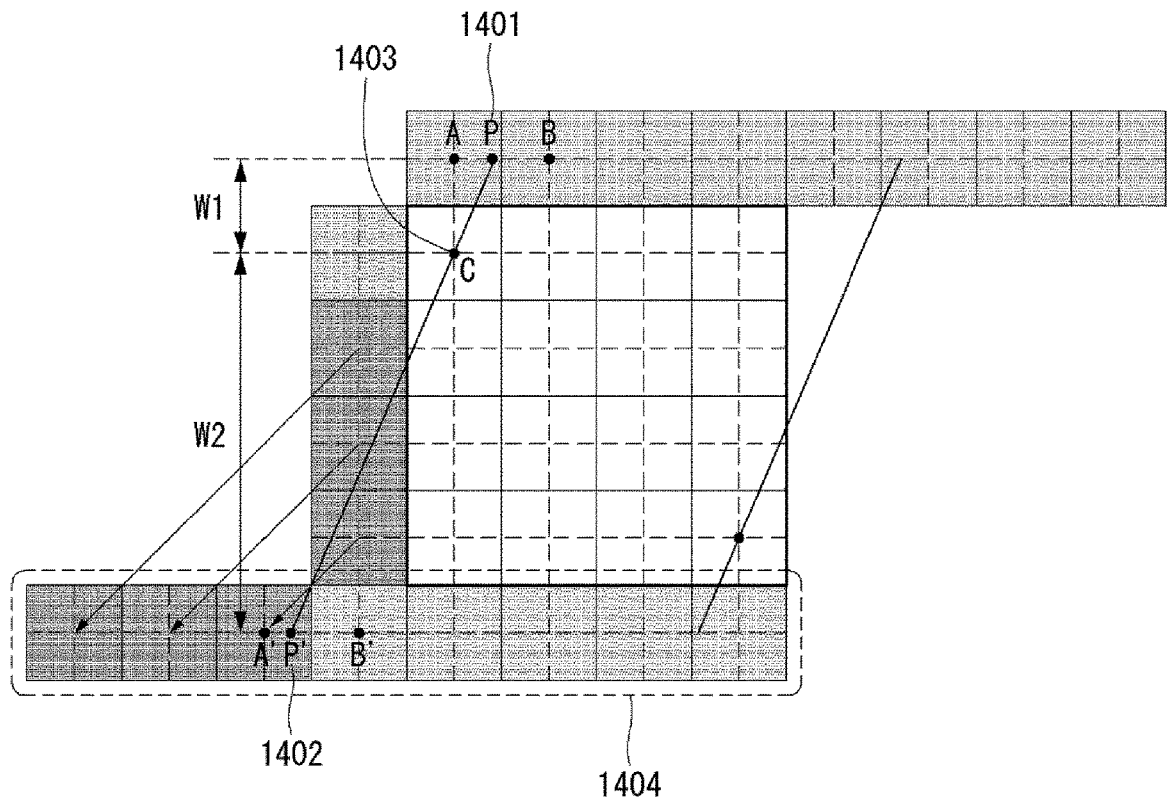
FIG. 14 is a diagram for illustrating a linear interpolation prediction method as an embodiment to which the present invention is applied.

FIGS. 13 and 14 are diagrams for illustrating linear interpolation prediction methods as embodiments to which the present invention is applied.

In FIGS. 13 and 14, an example in which the direction of an intra-prediction mode of a current block belongs to the region of the vertical direction and positive angle direction (i.e., the region D in FIG. 8) is described for convenience of description.

Referring to FIG. 13, the encoder/decoder may derive an intra-prediction mode and generate the value of a first prediction sample P 1301 based on the derived intra-prediction mode. The encoder/decoder may determine a reference sample A and a reference sample B depending on the direction and angle of the intra-prediction mode of a current sample C 1303, and may derive the value of the first prediction sample P 1301 by linearly interpolating the reference sample A and the reference sample.

That is, if the direction of an intra-prediction mode of a current block belongs to the region of the vertical direction and positive angle direction (i.e., the region D in FIG. 8), the encoder/decoder may derive the value of the first prediction sample P 1301 based on the value of a reference sample that belongs to samples neighboring the top or top right of the current block and that is used for prediction based on the intra-prediction mode or may derive the value of the first prediction sample P 1301 based on a value obtained by linearly interpolating two reference samples.

Furthermore, the encoder/decoder may generate the value of the value of the second prediction sample P' 1302 based on the derived intra-prediction mode. The encoder/decoder may determine a reference sample A' and a reference sample B' depending on the direction and angle of the intra-prediction mode of the current block, and may derive the value of the second prediction sample P' 1302 by linearly interpolating the reference sample A' and the reference sample B'.

That is, if the direction of an intra-prediction mode of a current block belongs to the region of the vertical direction and positive angle direction (i.e., the region D in FIG. 8), the encoder/decoder may derive the value of the second prediction sample P' 1302 based on the value of a reference sample that belongs to a sample neighboring the left of the current block or a bottom sample of the current block and that is used for prediction based on the intra-prediction mode, or may derive the value of the second prediction sample P' 1302 based on a value obtained by linearly interpolating two reference samples.

With respect to the direction of an intra-prediction mode illustrated in FIG. 13, the encoder/decoder may derive the value of a first prediction sample and the value of a second prediction sample using the same method.

For example, if the direction of an intra-prediction mode of a current block belongs to the region of the horizontal direction and positive angle direction (i.e., the region A in FIG. 8), the value of the first prediction sample P 1301 may be derived as a value of one reference sample which is used for prediction based on the intra-prediction mode among a sample neighboring the left of the current block or a sample neighboring bottom left of the current block, or the value of the first prediction sample P 1301 may be derived as a value obtained by linearly interpolating two reference samples.

Furthermore, the value of the second prediction sample P' 1302 may be derived as the value of a sample neighboring the top of the current block, or as a value of one reference sample used for prediction based on the intra-prediction mode among right reference samples. Or the value of the second prediction sample P' 1302 may be derived as a value obtained by linearly interpolating two reference samples.

Furthermore, for example, if the direction of an intra-prediction mode of a current block belongs to the region of the horizontal direction and negative angle direction (i.e., the region B in FIG. 8), the value of the first prediction sample P 1301 may be derived as the value of one reference sample which is used for prediction based on the intra-prediction mode among a top left reference sample neighboring the current block or samples neighboring the left or top of the current block. Or the value of the first prediction sample P 1301 may be derived based on a value obtained by linearly interpolating two reference samples. Furthermore, the value of the second prediction sample P' 1302 may be derived as the value of one reference sample which is used for prediction based on the intra-prediction mode among a bottom right sample neighboring the current block and the bottom sample or right sample of the current sample. Or the value of the second prediction sample P' 1302 may be derived as a value obtained by linearly interpolating two reference samples.

Furthermore, for example, if the direction of an intra-prediction mode of a current block belongs to the region of the vertical direction and negative angle direction (i.e., the region C in FIG. 8), the value of the first prediction sample P 1301 may be derived as the value of one reference sample which is used for prediction based on the intra-prediction mode among the top left reference sample neighboring the current block or a sample neighboring the left or top of the current block. Or the value of the first prediction sample P 1301 may be derived as a value obtained by linearly interpolating two reference samples. Furthermore, the value of the second prediction sample P' 1302 may be derived as the value of one reference sample which is used for prediction based on the intra-prediction mode among a bottom right sample neighboring the current block, the bottom sample of the current block or right sample of the current block. Or the value of the second prediction sample P' 1302 may be derived as a value obtained by linearly interpolating two reference samples.

When the value of the first prediction sample P 1301 and the value of the second prediction sample P' 1302 are derived, the prediction sample (or final prediction sample) of the current sample C 1303 may be generated by linearly interpolating the value of the first prediction sample P 1301 and the value of the second prediction sample P' 1302.

In this case, a prediction sample value of the current sample C 1303 may be calculated as in Equation 4.

$$C=(w_2*P+w_1*P'+(w_1+w_2)/2)/(w_1+w_2) \quad \text{[Equation 4]}$$

In Equation 4, $w_1$ may be calculated as the distance between the first prediction sample P 1301 and the current sample C 1303, and $w_2$ may be calculated as the distance between the second prediction sample 1302 and the current sample C 1303. That is, the encoder/decoder may generate the prediction sample of the current sample C 1303 by applying a weight value according to the distance ratio to the value of the first prediction sample 1301 and the value of the second prediction sample 1302 and by linearly interpolating them. The encoder/decoder may generate the prediction block of a current block by applying the same method to all of prediction samples within the current block.

With respect to a direction other than the directions of an intra-prediction mode illustrated in FIG. 13, the encoder/decoder may calculate the prediction sample value of a current sample using Equation 4.

That is, the encoder/decoder may generate the prediction sample of a current sample (or current block) by applying and combining weight values according to the distance between a first prediction sample and the current sample and the distance between a second prediction sample and the current sample in all of intra-prediction modes having directions (e.g., intra-prediction modes having 33 directions in HEVC). In this case, the prediction sample value of the current sample may be calculated using Equation 4.

When deriving the value of the second prediction sample, the encoder/decoder may generate a reference sample array and derive the value of the second prediction sample based on the value of one reference sample which is used for prediction based on an intra-prediction mode among a reference sample array, or may derive the value of the second prediction sample as a value obtained by linearly interpolating two reference samples.

The reference sample array may mean an array including reference samples that belong to the neighboring samples of a current block and that is used for prediction based on an intra-prediction mode of the current block.

A first reference sample array may mean an array including reference samples used for prediction based on an intra-prediction mode of a current block in order to generate a value of a first prediction sample.

A second reference sample array may mean an array including reference samples used for prediction based on an intra-prediction mode of a current block in order to generate a value of the second prediction sample. The second reference sample array may include a right reference sample array and/or a bottom reference sample array to be described later.

Referring to FIG. 14, the value of a first prediction sample P 1401 may be derived using the method described in FIG. 13. That is, the encoder/decoder may derive an intra-prediction mode and generate the value of the first prediction sample P 1401 based on the derived intra-prediction mode. A reference sample A and a reference sample B may be used depending on the direction and angle of an intra-prediction mode of a current sample C 1403, and the value of the first prediction sample P 1401 may be derived by linearly interpolating the reference sample A and the reference sample B.

That is, if the direction of an intra-prediction mode of a current block belongs to the region of the vertical direction and positive angle direction (i.e., the region D in FIG. 8), the encoder/decoder may derive the value of the first prediction sample P 1401 as the value of a reference sample which is used for prediction based on the intra-prediction mode among the top reference sample or the top right reference sample of the current block or may derive the value of the first prediction sample P 1401 as a value obtained by linearly interpolating two reference samples.

In order to drive a value of the second prediction sample, the encoder/decoder may first generate a reference sample array 1404. It is assumed that the horizontal and vertical coordinates of a current sample C 1403 are [0,0], for convenience of description.

If the direction of the intra-prediction mode of the current block belongs to the region of the vertical direction and positive angle direction (i.e., the region D in FIG. 8), the encoder/decoder may generate the bottom reference sample array 1404 by duplicating a sample neighboring the left of the current block to the left of the bottom sample.

Referring to FIG. 14, for example, if the number of samples that belong to neighboring samples on the left of a current block and that are used for prediction is 3 according to an intra-prediction mode of the current block and the horizontal and vertical coordinates of the samples are [−1,1], [−1,2] and [−1,3], respectively, the encoder/decoder may generate a bottom sample butter by duplicating the reference sample located at [−1, 1] to a location of [−4,4], duplicating the reference sample located at [−1,2] to a location of [−3,4], and duplicating the reference sample located at [−1,3] to a location of [−2,4].

The encoder/decoder may generate a bottom reference sample array 1404 using the generated bottom sample buffer and bottom samples. The encoder/decoder may derive the value of a second prediction sample P' 1402 as the value of one reference sample among the generated bottom reference sample array 1404 based on an intra-prediction mode of the current block or may derive the value of the second prediction sample P' 1402 as a value obtained by linearly interpolating two reference samples.

That is, the encoder/decoder may determine the reference sample A' and reference sample B' among the generated bottom reference sample array 1404 based on the intra-prediction mode of the current block, and may derive the value of the second prediction sample P' 1402 by linearly interpolating the reference sample A' and the reference sample B'.

The encoder/decoder may derive the value of the second prediction sample using the same method even in a mode other than the prediction mode illustrated in FIG. 14.

For example, if the direction of an intra-prediction mode of a current block belongs to the region of the horizontal direction and positive angle direction (i.e., the region A in FIG. 8), the encoder/decoder may generate a right reference sample array by duplicating a sample neighboring the top of the current block to the top of a right sample. The encoder/decoder may derive the value of a second prediction sample using one reference sample among the generated right reference sample array based on the intra-prediction mode of the current block, or may derive the value of the second prediction sample from a value obtained by linearly interpolating two reference samples.

Furthermore, if the direction of an intra-prediction mode of a current block belongs to the region of the horizontal direction and negative angle direction (i.e., the region B in FIG. 8), the encoder/decoder may generate a right reference sample array by duplicating a bottom sample to the bottom of a right sample. The encoder/decoder may derive a value of a second prediction sample using one reference sample among the generated right reference sample array based on the intra-prediction mode of the current block or derive the value of the second prediction sample from a value obtained by linearly interpolating two reference samples.

Furthermore, if the direction of an intra-prediction mode of a current block belongs to the region of the vertical direction and negative angle direction (i.e., the region C in FIG. 8), the encoder/decoder may generate a bottom reference sample array by duplicating a right sample to the right of a bottom sample. The encoder/decoder may derive the value of the second prediction sample based on the value of one reference sample among the generated bottom reference sample array based on the intra-prediction mode of the current block or may derive the value of the second prediction sample from a value obtained by linearly interpolating two reference samples.

The encoder/decoder may generate the prediction sample (or final prediction sample) of a current sample by linearly interpolating the derived values of the first prediction sample and second prediction sample. In this case, the encoder/decoder may generate the prediction sample of the current sample according to Equation 4 using the same method as that illustrated in FIG. 13. That is, the encoder/decoder may generate the prediction sample value of the current sample by applying the weight values $w_1$ and $w_2$ to the values of the first prediction sample and second prediction sample and linearly interpolating them. A method of calculating $w_1$ and $w_2$ is described with reference to the following drawing.

Figure 15:
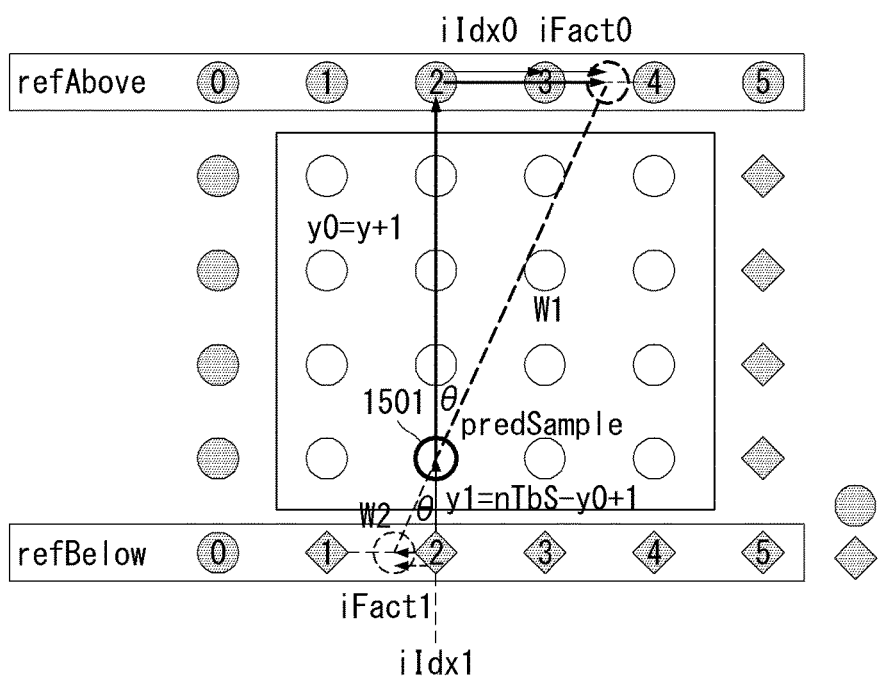
FIG. 15 is a diagram for illustrating a method of calculating weight values, which are applied upon performing the linear interpolation, as an embodiment to which the present invention is applied.

FIG. 15 is a diagram for illustrating a method of calculating weight values, which are applied upon performing the linear interpolation, as an embodiment to which the present invention is applied.

Assuming that the horizontal and vertical coordinates of top left samples of a current block are [0,0], the coordinates of a current sample 1501 in FIG. 15 correspond to [1,3].

$w_1$ and $w_2$ may be calculated using a method, such as Equation 5.

$$iIdx0 = (\text{intraPredAngle} * y0) >> 5$$

$$iFact0 = (\text{intraPredAngle} * y0) \& 31$$

$$iIdx1 = (\text{intraPredAngle} * y0) >> 5$$

$$iFact1 = (\text{intraPredAngle} * y0) \& 31$$

$$w_1 = \sqrt{(iIdx0 << 5 + iFact0)^2 + (y0 << 5)^2}$$

$$w_2 = \sqrt{(iIdx1 << 5 + iFact1)^2 + (y1 << 5)^2} \quad \text{[Equation 5]}$$

iIdx0 is a parameter to determine what place is a reference sample located from the reference sample array (i.e., the second reference sample array) used to generate the value of the second prediction sample. iIdx1 is a parameter to determine what place is a reference sample located from the reference sample array (i.e., the second reference sample array) used to generate the value of the second prediction sample.

iFact0 and iFact1 are parameters for obtaining a value between two reference samples.

intraPredAngle may mean a value obtained by previously calculating a tan value of θ indicative of the angle of the intra-prediction mode of the current block and making it integer 32 times.

y0 may mean the vertical distance between the current sample and the main array (or reference sample array).

y1 may mean the vertical distance between the current sample and the main array (or reference sample array).

Referring to FIG. 15, the values intraPredAngle, iIdx0 and iFact0 may be determined depending on the intra-prediction mode of the current block. The second reference sample (i.e., No. 3 reference sample) of the top main array (refAbove) (or reference sample array) may be determined based on the current sample 1501 of the value iIdx0. Furthermore, a value between No. 3 reference sample and No. 4 reference sample may be determined as a value of a first prediction sample based on the value iFact0.

The value y0 may be calculated by an equation y0=y+1. In this case, y means the vertical coordinates of the current sample 1501. That is, the value y0 may be calculated as 4 by adding 1 to the vertical coordinate value 3 of the current sample 1501.

$w_1$ may be calculated using the values iIdx0, iFact0 and y0. $w_1$ may mean the distance between the first prediction sample and the current sample 1501.

Furthermore, the values intraPredAngle, iIdx1 and iFact1 may be determined depending on the intra-prediction mode of the current block. The first reference sample (i.e., No. 2 reference sample) of the bottom main array (refBelow) (or reference sample array) may be determined based on the current sample 1501 depending on the value iIdx1. Furthermore, a value between No. 2 reference sample and No. 1 reference sample may be determined as the value of the second prediction sample depending on the value iFact1.

The value y1 value may be calculated from an equation y1=nTbs−y0+1. In this case, nTbs means the size of the current block (e.g., the value nTbs is 4 in the case of a block of a 4×4 size). That is, the value y1 may be calculated by subtracting 4, that is, the value y0, from the value 4, that is, the size of the current block and adding 1.

$w_2$ may be calculated using iIdx1, iFact1 and y1. $w_2$ may mean the distance between the second prediction sample and the current sample 1501.

The encoder/decoder may derive the value of the first prediction sample and the value of the second prediction sample, may calculate the values $w_1$ and $w_2$ by applying Equation 5, and may calculate the prediction sample value of the current sample by applying Equation 4. The encoder/decoder may generate the prediction block of the current block by applying the same method to all of prediction samples within the current block.

Figure 16:
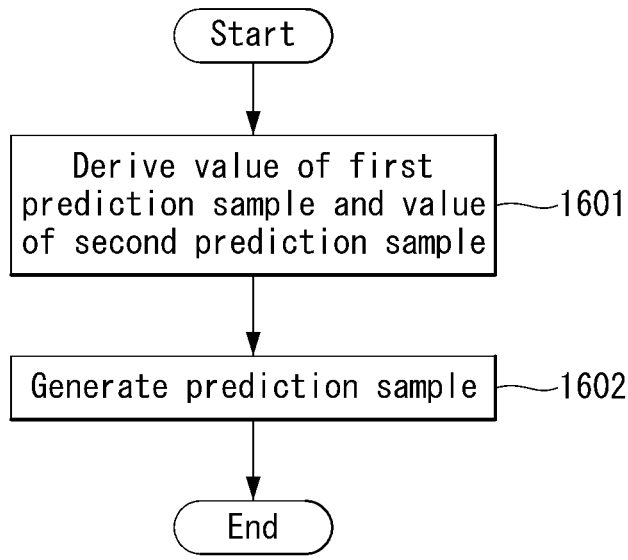
FIG. 16 is a diagram illustrating a linear interpolation prediction method based on an intra-prediction mode according to an embodiment to which the present invention.

FIG. 16 is a diagram illustrating a linear interpolation prediction method based on an intra-prediction mode according to an embodiment to which the present invention.

The encoder/decoder derives a value of a first prediction sample and a value of a second prediction sample using neighboring samples of a current block based on an intra-prediction mode of the current block (S1601).

As described above, the encoder/decoder may derive the intra-prediction mode of the current block, may check whether the neighboring samples of the current block can be used for prediction, and may configure reference samples to be used for prediction.

The encoder/decoder may derive the value of the first prediction sample using the reference samples used for prediction depending on the intra-prediction mode.

The encoder/decoder may derive the value of the second prediction sample using the neighboring samples of the current block depending on the direction and angle of the intra-prediction mode.

The encoder/decoder may determine one reference sample for linear interpolation based on the intra-prediction mode and derive the value of the second prediction sample using the determined reference sample value.

In this case, the encoder/decoder may generate a bottom right sample neighboring the current block, may determine the bottom right sample to be a reference sample for linear interpolation depending on the direction and angle of the intra-prediction mode, and may derive the value of the second prediction sample based on the determined reference sample value.

Furthermore, the encoder/decoder may derive the value of the second prediction sample based on the value of one reference sample of neighboring samples depending on the direction and angle of the intra-prediction mode, or may derive the value of the second prediction sample based on a value obtained by linearly interpolating two reference samples.

In this case, the encoder/decoder may generate a bottom sample neighboring the bottom of the current block and a right sample neighboring the right of the current block. Furthermore, the encoder/decoder may generate a reference sample array, and may derive the value of the second prediction sample based on the value of one reference sample of the reference sample array based on the intra-prediction mode or may derive the value of the second prediction sample based on a value obtained by linearly interpolating two reference samples.

After deriving the value of the first prediction sample and the value of the second prediction sample, the encoder/decoder generates a prediction sample of the current block by linearly interpolating the value of the first prediction sample and the value of the second prediction sample (S1602).

The encoder/decoder may calculate the prediction sample value of the current sample by applying weight values according to the distance between the first prediction sample and the current sample and the distance between the second prediction sample and the current sample to the value of the first prediction sample and the value of the second prediction sample and linearly interpolating them. The encoder/decoder may generate the prediction block (or prediction sample) of the current block by applying the same method to all of samples within the current sample.

In this specification, the method of generating a prediction sample for a current block by deriving the values of two prediction samples (second prediction sample and second prediction sample) and linearly interpolating the derived prediction sample values has been described, but the present invention is not limited thereto. That is, a prediction sample for a current block may be generated by deriving the values of a plurality of prediction samples depending on one or more intra-prediction modes for the current block and linearly interpolating the derived values of the prediction samples.

For example, if two intra-prediction modes are determined, a prediction sample for a current block may be generated by deriving 会 a total of prediction sample values depending on respective intra-prediction modes and linearly interpolating the derived values of the prediction samples.

The linear interpolation intra-prediction method proposed by this specification may be applied to all of intra-prediction modes having directions (e.g., the intra-prediction modes having 33 directions in HEVC).

The decoder may parse a flag indicative of a linear interpolation intra-prediction mode and determine whether or not to apply the linear interpolation intra-prediction method. That is, a syntax indicating whether or not to apply the linear interpolation intra-prediction mode may be defined. For example, lip_flag may be defined.

The syntax of linear interpolation inter-frame prediction proposed by this specification may be defined as follows.

TABLE 3

| | Descriptor |
|---|---|
| coding_unit( x0, y0, log2CbSize ) { | |
|   if( transquant_bypass_enabled_flag ) | |
|     cu_transquant_bypass_flag | ae(v) |

TABLE 3-continued

| | Descriptor |
|---|---|
| if( slice_type != I )<br>    cu_skip_flag[ x0 ][ y0 ]<br>nCbS = ( 1 << log2CbSize )<br>if( cu_skip_flag[ x0 ][ y0 ] )<br>    prediction_unit( x0, y0, nCbS, nCbS )<br>else {<br>    if( slice_type != I )<br>        pred_mode_flag<br>    if( CuPredMode[ x0 ][ y0 ] != MODE_INTRA \| \| log2CbSize = =<br>MinCbLog2SizeY )<br>        part_mode<br>    if( CuPredMode[ x0 ][ y0 ] = = MODE_INTRA ) {<br>        if( PartMode = = PART_2Nx2N && pcm_enabled_flag &&<br>            log2CbSize >= Log2MinIpcmCbSizeY &&<br>            log2CbSize <= Log2MaxIpcmCbSizeY )<br>            pcm_flag[ x0 ][ y0 ]<br>        if( pcm_flag[ x0 ][ y0 ] ) {<br>            while( !byte_aligned( ) )<br>                pcm_alignment_zero_bit<br>            pcm_sample( x0, y0, log2CbSize )<br>        } else {<br>            lip_flag[ x0 ][ y0 ]<br>            pbOffset = ( PartMode = = PART_NxN ) ? ( nCbS / 2 ) : nCbS<br>            for( j = 0; j < nCbS; j = j + pbOffset )<br>                for( i = 0; i < nCbS; i = i + pbOffset )<br>                    prev_intra_luma_pred_flag[ x0 + i ][ y0 + j ]<br>            for( j = 0; j < nCbS; j = j + pbOffset )<br>                for( i = 0; i < nCbS; i = i + pbOffset )<br>                  if( prev_intra_luma_pred_flag[ x0 + i ][ y0 + j ] )<br>                    mpm_idx[ x0 + i ][ y0 + j ]<br>                  else<br>                    rem_intra_luma_pred_mode[ x0 + i ][ y0 + j ]<br>            intra_chroma_pred_mode[ x0 ][ y0 ]<br>        }<br>    } else {<br>        if( PartMode = = PART_2Nx2N )<br>            prediction_unit( x0, y0, nCbS, nCbS )<br>        else if( PartMode = = PART_2NxN ) {<br>            prediction_unit( x0, y0, nCbS, nCbS / 2 )<br>            prediction_unit( x0, y0 + ( nCbS / 2 ), nCbS, nCbS / 2 )<br>        } else if( PartMode = = PART_Nx2N ) {<br>            prediction_unit( x0, y0, nCbS / 2, nCbS )<br>            prediction_unit( x0 + ( nCbS / 2 ), y0, nCbS / 2, nCbS )<br>        } else if( PartMode = = PART_2NxnU ) {<br>            prediction_unit( x0, y0, nCbS, nCbS / 4 )<br>            prediction_unit( x0, y0 + ( nCbS / 4 ), nCbS, nCbS * 3 / 4 )<br>        } else if( PartMode = = PART_2NxnD ) {<br>            prediction_unit( x0, y0, nCbS, nCbS * 3 / 4 )<br>            prediction_unit( x0, y0 + ( nCbS * 3 / 4 ), nCbS, nCbS / 4 )<br>        } else if( PartMode = = PART_nLx2N ) {<br>            prediction_unit( x0, y0, nCbS / 4, nCbS )<br>            prediction_unit( x0 + ( nCbS / 4 ), y0, nCbS * 3 / 4, nCbS )<br>        } else if( PartMode = = PART_nRx2N ) {<br>            prediction_unit( x0, y0, nCbS * 3 / 4, nCbS )<br>            prediction_unit( x0 + ( nCbS * 3 / 4 ), y0, nCbS / 4, nCbS )<br>        } else { /* PART_NxN */<br>            prediction_unit( x0, y0, nCbS / 2, nCbS / 2 )<br>            prediction_unit( x0 + ( nCbS / 2 ), y0, nCbS / 2, nCbS / 2 )<br>            prediction_unit( x0, y0 + ( nCbS / 2 ), nCbS / 2, nCbS / 2 )<br>            prediction_unit( x0 + ( nCbS / 2 ), y0 + ( nCbS / 2 ), nCbS / 2, nCbS / 2 )<br>        }<br>    }<br>    if( !pcm_flag[ x0 ][ y0 ] ) {<br>        if( CuPredMode[ x0 ][ y0 ] != MODE_INTRA &&<br>            !( PartMode = = PART_2Nx2N && merge_flag[ x0 ][ y0 ] ) )<br>            rqt_root_cbf<br>        if( rqt_root_cbf ) {<br>            MaxTrafoDepth = ( CuPredMode[ x0 ][ y0 ] = = MODE_INTRA ?<br>                ( max_transform_hierarchy_depth_intra + IntraSplitFlag ) :<br>                max_transform_hierarchy_depth_inter)<br>            transform_tree( x0, y0, x0, y0, log2CbSize, 0, 0 )<br>        }<br>    }<br>    }<br>} | ae(v)<br><br><br><br><br><br>ae(v)<br><br><br>ae(v)<br><br><br><br><br>ae(v)<br><br>f(1)<br><br><br>ae(v)<br><br><br><br>ae(v)<br><br><br><br>ae(v)<br>ae(v)<br>ae(v)<br><br><br><br><br><br><br><br><br><br><br><br><br><br><br><br><br><br><br><br><br><br><br><br><br><br><br><br>ae(v) |

A decoding process for the coding unit (or coding block) is described with reference to Table 3.

if(transquant_bypass_enabled_flag): when a decoding process "coding_unit(x0, y0, log 2CbSize)" for a coding unit (or coding block) is fetched (In this case, x0, y0 indicates the relative location of the top left sample of a current coding unit from the top left sample of a current picture. Furthermore, log 2CbSize indicates the size of the current coding unit). The decoder first determines whether "cu_transquant_bypass_flag" is present.

In this case, if a "transquant_bypass_enabled_flag" value is 1, it means that the "cu_transquant_bypass_flag" is present.

If cu_transquant_bypass_flag:"cu_transquant_bypass_flag" is present, the decoder parses the "cu_transquant_bypass_flag."

If the "cu_transquant_bypass_flag" value is 1, a scaling and transform process and an in-loop filter process may be skipped.

if(slice_type!=I): the decoder determines whether the slice type of the current coding unit is an I slice type or not.

cu_skip_flag[x0][y0]: if the slice type of the current coding unit is not, the decoder parses "cu_skip_flag [x0][y0]."

In this case, the "cu_skip_flag[x0][y0]" may indicate whether the current coding unit is a skip mode or not. That is, if the "cu_skip_flag[x0][y0]" is 1, it may indicate that an additional syntax element is not parsed other than index information for merge in a coding unit syntax.

nCbS=(1<<log 2CbSize): a variable nCbs is set as a "1<<log 2CbSize" value.

if(cu_skip_flag[x0][y0]): the decoder determines whether the current coding unit is a skip mode.

prediction unit(x0, y0, nCbS, nCbS): if the current coding unit is a skip mode, a decoding process "prediction_unit(x0, y0, nCbS, nCbS)" for a prediction unit (or prediction block) is fetched, and an additional syntax element is not signaled.

if(slice type !=I): in contrast, if the current coding unit is not a skip mode, the decoder determines whether the type of current slice is an I slice.

pred_mode_flag: if the slice type of current coding unit is not an I slice, the decoder parses "pred_mode_flag."

If a pred_mode_flag syntax element value is 0, it may mean that the current coding unit is encoded in an inter-frame prediction mode. If a pred_mode_flag syntax element value is 1, it may mean that the current coding unit is coded in an intra-frame prediction mode.

if(CuPredMode[x0][y0] !=MODE_INTRA||log 2CbSize==MinCbLog2SizeY): whether the prediction mode of the current coding unit is not an intra-mode and whether the size (log 2CbSize) of the current coding unit is the same as the size (MinCbLog2SizeY) of the least coding unit are determined.

If the size of the current coding unit is not the size of the least coding unit and the current coding unit has been encoded in the intra-prediction mode, it is not necessary to parse the "part_mode" syntax element because a split mode is 2N×2N.

part mode: if the prediction mode of the current coding unit is not the intra-mode or the size (log 2CbSize) of the current coding unit is the same as the size (MinCbLog2SizeY) of the least coding unit, the "part_mode" syntax element is parsed.

In this case, if the current coding unit has been coded in the intra-frame prediction mode, when "part_mode" has a value of 0 or 1, the current coding unit may mean PART_2N×2N or PART_N×N. if the current coding unit has been coded in the inter-frame prediction mode, the value "part_mode" may be sequentially allocated to PART_2N× 2N(0), PART_2N×N(1), PART_N×2N(2), PART_N×N(3), PART_2N×nU(4), PART_2N×nD(5), PART_nL×2N(6) and PART_nR×2N(7).

if(CuPredMode[x0][y0]==MODE_INTRA): the decoder determines whether the prediction mode of the current coding unit is the intra-mode.

if(PartMode==PART_2N×2N && pcm_enabled_flag && log 2CbSize>=Log 2MinIpcmCbSizeY && log 2CbSize<=Log 2MaxIpcmCbSizeY): the decoder determines whether the split mode of the current coding unit is PART_2N×2N, the current coding block is a pulse code modulation (PCM) mode, the size of the current coding unit is greater than or equal to Log 2MinIpcmCbSizeY, and the size of the current coding unit is smaller than or equal to Log 2MaxIpcmCbSizeY.

A pulse code modulation (PCM) mode means one of lossless compression methods of performing encoding on pixel samples with respect to a PCM sample bit depth without performing prediction, transform, quantization and entropy coding. In the PCM mode, the encoder may limit a defined amount of encoding bits to an upper limit and perform encoding.

pcm_flag[x0][y0]: if the split mode of the current coding unit is PART_2N×2N, the current coding block is the PCM mode, the size of the current coding unit is greater than or equal to Log 2MinIpcmCbSizeY, and the size of the current coding unit is smaller than or equal to Log 2MaxIpcmCbSizeY, the decoder parses "pcm_flag[x0] [y0]."

In this case, if the "pcm_flag[x0][y0]" value is 1, it means that a "pcm_sample( )" syntax is present in the coordinates (x0, y0) and a "transform_tree( ) syntax is not present in a coding unit of a luma component. If the pcm_flag[x0][y0]" value is 0, it means that a "pcm_sample ( )" syntax is not present in the coordinates (x0, y0) in the coding unit of a luma component.

if(pcm_flag[x0][y0]): the decoder determines whether the current coding unit is the PCM mode.

while(!byte_aligned ( )): if the current coding unit is the PCM mode, the decoder determines whether a current position is not located at the boundary of one byte in a bit stream.

pcm_alignment_zero_bit: if the current position is not present at the boundary of one byte in the bit stream, the decoder parses pcm_alignment_zero_bit.

In this case, a value of pcm_alignment_zero_bit is 0.

pcm_sample (x0, y0, log 2CbSize): Furthermore, the decoder fetches a pcm_sample (x0, y0, log 2CbSize) syntax if the current coding unit is the PCM mode.

The "pcm_sample ( )" syntax indicates the value of a luma component or chroma component encoded in a raster scan order in the current coding unit. The PCM sample bit depth of the luma component or chroma component of the current coding unit may be indicated using the number of bits.

lip_flag[x0][y0]: if the current coding unit has not been coded in the PCM mode, the decoder parses lip_flag.

lip_flag may indicate whether a current block is applied to the linear interpolation intra-prediction mode or not. If lip_flag is 1, it may mean that the linear interpolation prediction mode is applied.

pbOffset=(PartMode==PART_N×N) ? (nCbS/2): nCbS: if the current coding unit has not been coded in the PCM mode, the value of a parameter pbOffset is set as a nCbS/2 value if the split mode PartMode of the current coding unit is PART_N×N and the value of a parameter pbOffset is set an nCbS value if the split mode Part-Mode of the current coding unit is PART_2N×2N.

for(j=0; j<nCbS; j=j+pbOffset)
for(i=0; i<nCbS; i=i+pbOffset)
prev_intra_luma_pred_flag[x0+i][y0+j]: the decoder parses prev_intra_luma_pred_flag[x0+i][y0+j] for each prediction unit.

For example, if the split mode PartMode of the current coding unit is PART_2N×2N, the pbOffset value is set as the nCbS value. In this case, only prev_intra_luma_pred_flag [x0][y0] is parsed.

If the split mode PartMode of the current coding unit is PART_N×N, the pbOffset value is set as the nCbS/2 value. In this case, the decoder parses prev_intra_luma_pred_flag [x0][y0], prev_intra_luma_pred_flag[x0+nCbS/2][y0], prev_intra_luma_pred_flag[x0][y0+nCbS/2], and prev_intra_luma_pred_flag[x0+nCbS/2][y0+nCbS/2].

That is, the decoder parses prev_intra_luma_pred_flag for each prediction unit. If the prev_intra_luma_pred_flag value is 1, it means that the intra-prediction mode of the current prediction unit is included in the most probable mode (MPM). If the prev_intra_luma_pred_flag value is 0, it means that the intra-prediction mode of the current prediction unit is not included in the most probable mode (MPM).

for(j=0; j<nCbS; j=j+pbOffset)
for(i=0; i<nCbS; i=i+pbOffset)
if(prev_intra_luma_pred_flag[x0+i][y0+j]): as described above, the decoder determines whether the intra-prediction mode of the current prediction unit is included in the most probable mode (MPM) for each prediction unit.

mpm_idx[x0+i][y0+j]: if the intra-prediction mode of the current prediction unit is included in the most probable mode (MPM), the decoder parses MPM index mpm_idx.

In this case, if the MPM index mpm_idx is 0, 1 and 2, they indicate Intra_Planar, intra_DC, and intra_Vertical modes, respectively.

rem_intra_luma_pred_mode[x0+i][y0+j]: if the intra-prediction mode of the current prediction unit is not included in the most probable mode (MPM), the decoder parses rem_intra_luma_pred_mode.

That is, the decoder may derive an intra-prediction mode for the current prediction unit by decoding rem_intra_luma_pred_mode through a fixed 5-bit binary table with respect to the remaining 32 modes not included in the most probable mode (MPM).

intra_chroma_pred_mode[x0][y0]: if the prediction mode of the current coding unit is the intra-mode and does not correspond to the PCM mode, the decoder parses an intra_chroma_pred_mode syntax element indicative of a prediction mode of a chroma component for each prediction unit.

if(PartMode==PART_2N×2N): if the prediction mode of the current coding unit is the inter-mode, the decoder determines whether the split mode PartMode of the current coding unit is PART_2N×2N.

prediction_unit(x0, y0, nCbS, nCbS): if the split mode PartMode of the current coding unit is PART_2N×2N, the decoder fetches a decoding process prediction_unit (x0, y0, nCbS, nCbS) for a prediction unit (or prediction block).

else if(PartMode==PART_2N×N): the decoder determines whether the split mode PartMode of the current coding unit is PART_2N×N.

prediction unit(x0, y0, nCbS, nCbS/2)
prediction unit(x0, y0+(nCbS/2), nCbS, nCbS/2): if the split mode PartMode of the current coding unit is PART_2N×N, the decoder fetches a decoding process prediction unit(x0, y0, nCbS, nCbS/2) and prediction_unit(x0, y0+(nCbS/2), nCbS, nCbS/2) for a prediction unit (or prediction block).

else if(PartMode==PART_N×2N): the decoder determines whether the split mode PartMode of the current coding unit is PART_N×2N.

prediction_unit(x0, y0, nCbS/2, nCbS)
prediction_unit(x0+(nCbS/2), y0, nCbS/2, nCbS): if the split mode PartMode of the current coding unit is PART_N×2N, the decoder fetches a decoding process prediction_unit (x0, y0, nCbS/2, nCbS) and prediction_unit(x0+(nCbS/2), y0, nCbS/2, nCbS) for a prediction unit (or prediction block).

else if(PartMode==PART_2N×nU): the decoder determines whether the split mode PartMode of the current coding unit is PART_2N×nU.

prediction_unit(x0, y0, nCbS, nCbS/4)
prediction_unit(x0, y0+(nCbS/4), nCbS, nCbS*¾): if the split mode PartMode of the current coding unit is PART_2N×nU, the decoder fetches a decoding process prediction_unit(x0, y0, nCbS, nCbS/4) and prediction_unit (x0, y0+(nCbS/4), nCbS, nCbS*¾) for a prediction unit (or prediction block).

else if(PartMode==PART_2N×nD): the decoder determines whether the split mode PartMode of the current coding unit is PART_2N×nD.

prediction_unit(x0, y0, nCbS, nCbS*¾)
prediction_unit(x0, y0+(nCbS*¾), nCbS, nCbS/4): if the split mode PartMode of the current coding unit is PART_2N×nD, the decoder fetches a decoding process prediction unit(x0, y0, nCbS, nCbS*¾) and prediction unit (x0, y0+(nCbS*¾), nCbS, nCbS/4) for a prediction unit (or prediction block).

else if(PartMode==PART_nL×2N): the decoder determines whether the split mode PartMode of the current coding unit is PART_nL×2N.

prediction_unit(x0, y0, nCbS/4, nCbS)
prediction_unit(x0+(nCbS/4), y0, nCbS*¾, nCbS): if the split mode PartMode of the current coding unit is PART_nL×2N, the decoder fetches a decoding process prediction unit(x0, y0, nCbS/4, nCbS) and prediction_unit(x0+ (nCbS/4), y0, nCbS*¾, nCbS) for a prediction unit (or prediction block).

else if(PartMode==PART_nR×2N): the decoder determines whether the split mode PartMode of the current coding unit is PART_nR×2N.

prediction_unit(x0, y0, nCbS*¾, nCbS)
prediction_unit(x0+(nCbS*¾), y0, nCbS/4, nCbS): if the split mode PartMode of the current coding unit is PART_nL×2N, the decoder fetches a decoding process prediction_unit(x0, y0, nCbS*¾, nCbS) and prediction_unit (x0+(nCbS*¾), y0, nCbS/4, nCbS) for a prediction unit (or prediction block).

prediction_unit(x0, y0, nCbS/2, nCbS/2)
prediction_unit(x0+(nCbS/2), y0, nCbS/2, nCbS/2)
prediction_unit(x0, y0+(nCbS/2), nCbS/2, nCbS/2)
prediction_unit(x0+(nCbS/2), y0+(nCbS/2), nCbS/2, nCbS/2): if the split mode PartMode of the current coding unit is PART_N×N, the decoder fetches a decoding process prediction_unit(x0, y0, nCbS/2, nCbS/2), prediction_unit (x0+(nCbS/2), y0, nCbS/2, nCbS/2), prediction_unit(x0, y0+(nCbS/2), nCbS/2, nCbS/2) and prediction unit(x0+(nCbS/2), y0+(nCbS/2), nCbS/2, nCbS/2) for a prediction unit (or prediction block).

if(CuPredMode[x0][y0] !=MODE_INTRA && ! (PartMode==PART_2N×2N && merge_flag[x0][y0])): the decoder determines whether the prediction mode of the current coding unit is not the intra-mode, the current coding unit is a merge mode, and the split mode is also PART_2N×2N.

rqt_root_cbf: if the prediction mode of the current coding unit is not an intra-mode, the current coding unit is a merge mode and the split mode is also not PART_2N×2N, the decoder parses rqt_root_cbf.

If rqt_root_cbf value is 1, it means that a transform tree syntax (transform_tree ( ) syntax) for the current coding unit is present. If rqt_root_cbf value is 0, it means that the transform tree syntax (transform_tree ( ) syntax) is not present.

if(rqt_root_cbf): the decoder determines whether rqt_root_cbf syntax element value is 1, that is, whether or not to fetch the transform tree syntax (transform_tree ( ) syntax).

MaxTrafoDepth=(CuPredMode[x0][y0]==MODE_INTRA ? (max_transform_hierarchy_depth_intra+IntraSplitFlag): max_transform_hierarchy_depth_inter): the decoder sets a parameter MaxTrafoDepth value and sets a max_transform_hierarchy_depth_intra+IntraSplitFlag value if a current prediction mode is an intra-mode, and sets a max_transform_hierarchy_depth_inter value if the current prediction mode is the inter-mode.

In this case, the max transform_hierarchy_depth_intra value indicates a maximum layer depth for the transform block of the current coding block in the intra-prediction mode. The max_transform_hierarchy_depth_inter value indicates a maximum layer depth for the transform unit of the current coding unit in the inter-prediction mode. If the IntraSplitFlag value is 0, it indicates that the split mode is PART_2N×2N in the intra-mode. If the IntraSplitFlag value is 1, it indicates that the split mode is PART_N×N in the intra-mode.

Figure 17:
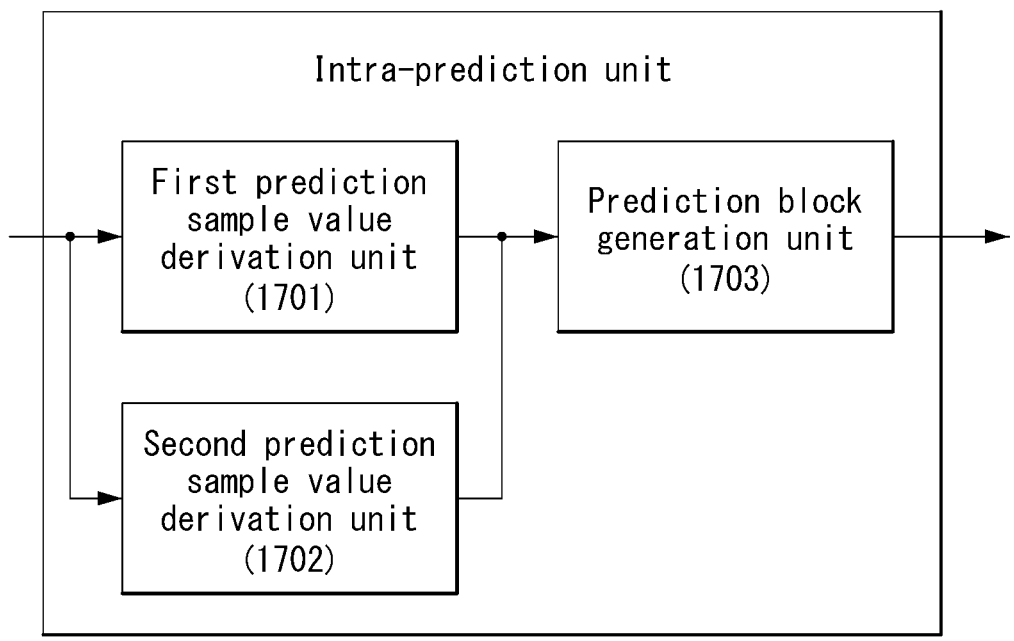
FIG. 17 is a diagram more specifically illustrating an intra-prediction unit according to an embodiment of the present invention.

FIG. 17 is a diagram more specifically illustrating an intra-prediction unit according to an embodiment of the present invention.

In FIG. 17, for convenience of description, the intra-prediction unit has been illustrated as being a single block, but the intra-prediction unit may be implemented to be included in the encoder and/or the decoder.

Referring to FIG. 17, the intra-prediction unit implements the functions, processes and/or methods proposed in FIGS. 7 to 16. Specifically, the intra-prediction unit may include a first prediction sample value derivation unit 1701, a second prediction sample value derivation unit 1702 and a prediction block generation unit 1703.

The first prediction sample value derivation unit 1701 may derive a value of a first prediction sample based on an intra-prediction mode of a current block.

More specifically, as described above, the first prediction sample value derivation unit 1701 may derive the intra-prediction mode of the current block, may check whether neighboring samples of the current block can be used for prediction, and may configure reference samples to be used for prediction.

The first prediction sample value derivation unit 1701 may derive a value of a first prediction sample using reference samples used for prediction depending on an intra-prediction mode.

The second prediction sample value derivation unit 1702 may derive a value of the second prediction sample using neighboring samples of the current block depending on the direction and angle of the intra-prediction mode of the current block.

The second prediction sample value derivation unit 1702 may determine one reference sample for linear interpolation based on an intra-prediction mode and derive a value of the second prediction sample based on the determined reference sample value.

In this case, the second prediction sample value derivation unit 1702 may generate a bottom right sample neighboring the current block, may determine the bottom right sample to be a reference sample for linear interpolation depending on the direction and angle of the intra-prediction mode, and may derive the value of the second prediction sample based on the determined reference sample value.

Furthermore, the second prediction sample value derivation unit 1702 may derive the value of one reference sample of neighboring samples as the value of the second prediction sample depending on the direction and angle of the intra-prediction mode, or may derive the value of the second prediction sample based on a value obtained by linearly interpolating two reference samples.

In this case, the second prediction sample value derivation unit 1702 may generate a bottom sample neighboring the bottom of the current block and a right sample neighboring the right of the current block. Furthermore, the second prediction sample value derivation unit 1702 may generate a reference sample array, and may derive the value of one reference sample of the reference sample array as the value of the second prediction sample based on the intra-prediction mode or derive the value of the second prediction sample based on a value obtained by linearly interpolating two reference samples.

The prediction block generation unit 1703 may generate the prediction sample of the current block by linearly interpolating the derived value of the first prediction sample and value of the second prediction sample.

The prediction block generation unit 1703 may calculate the prediction sample value of the current sample by applying weight values according to the distance between the second prediction sample and the current sample and the distance between the second prediction sample and the current sample to the value of the first prediction sample and value of the second prediction sample and linearly interpolating them.

The prediction block of the current block (or prediction sample) may be generated by applying the same method to all of samples within the current sample.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be configured by combining claims not having an explicit citation relation in the claims or may be included as a new claim by amendments after filing an application.

The embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method of processing video based on an intra-prediction mode, the method comprising:
generating a bottom right reference sample neighboring a current block;
generating a right reference sample neighboring the current block and a bottom reference sample neighboring the current block;
deriving a first predictor and a second predictor based on the intra-prediction mode of the current block, wherein:
in response to a direction of the intra-prediction mode belonging to a region of a horizontal and positive angle, the second predictor is derived based on a reference sample neighboring a right of the current block, a top of the current block, or a top right of the current block,
in response to a direction of the intra-prediction mode belonging to a region of a vertical and positive angle, the second predictor is derived based on a reference sample neighboring a left of the current block, a bottom of the current block, or a bottom left of the current block, and
in response to a direction of the intra-prediction mode belonging to a region of a negative angle, the second predictor is derived based on a reference sample neighboring the right of the current block, the bottom of the current block, or a bottom right of the current block; and
generating a prediction sample for the current block based on the first predictor and the second predictor.

2. The method of claim 1, wherein:
the right reference sample neighboring the current block is generated by linearly interpolating a top right reference sample neighboring the current block and the bottom right reference sample neighboring the current block, and
the bottom reference sample neighboring the current block is generated by linearly interpolating a bottom left reference sample neighboring the current block and the bottom right reference sample neighboring the current block.

3. The method of claim 1, wherein the bottom right reference sample neighboring the current block is generated based on a top right reference sample neighboring the current block and a bottom left reference sample neighboring the current block.

4. The method of claim 1, wherein in response to the current block being an N×N size and horizontal and vertical coordinates of a top left sample of the current block being [0,0], the bottom right reference sample neighboring the current block is generated based on a reference sample that is located at [2N−1, −1] and [−1, 2N−1] and that belongs to the neighboring reference samples of the current block.

5. The method of claim 1, wherein a value of the bottom right reference sample neighboring the current block is transmitted from an encoder.

6. The method of claim 1, wherein the prediction sample for the current block is generated by linear interpolation based on weight values determined based on a vertical distance between the prediction sample for the current block and a place where the first predictor is derived and a vertical distance between the prediction sample for the current block and a place where the second predictor is derived.

7. The method of claim 1, wherein the prediction sample for the current block is generated by linear interpolation based on weight values determined based on a distance between the prediction sample for the current block and a place where the first predictor is derived and a distance between the prediction sample for the current block and a place where the second predictor is derived.

8. A method of processing video based on an intra-prediction mode, the method comprising:
generating a bottom right reference sample neighboring a current block;
generating a right reference sample neighboring the current block and a bottom reference sample neighboring the current block; and
generating a reference sample array, wherein:
in response to a direction of the intra-prediction mode belonging to a region of a horizontal and positive angle direction, the reference sample array is a right reference sample array generated by duplicating a top reference sample neighboring the current block to a top of the right reference sample neighboring the current block,
in response to a direction of the intra-prediction mode belonging to a region of a vertical and positive angle direction, the reference sample array is a bottom reference sample array generated by duplicating a left reference sample neighboring the current block to a left of the bottom reference sample neighboring the current block, in response to a direction of the intra-prediction mode belonging to a region of a horizontal and negative angle direction, the reference sample array is a right reference sample array generated by duplicating the bottom reference sample neighboring the current block to a bottom of the right reference sample neighboring the current block, and in response to a direction of the intra-prediction mode belonging to a region of a vertical and negative angle direction, the reference sample array is a bottom reference sample array generated by duplicating the right reference sample neighboring the current block to a right of the bottom reference sample neighboring the current block;

deriving a first predictor and a second predictor based on the intra-prediction mode of the current block, wherein the second predictor is derived based on the reference sample array; and generating a prediction sample for the current block by linearly interpolating the first predictor and the second predictor.

9. The method of claim 8, wherein:

the right reference sample neighboring the current block is generated by linearly interpolating a top right reference sample neighboring the current block and the bottom right reference sample neighboring the current block, and the bottom reference sample neighboring the current block is generated by linearly interpolating a bottom left reference sample neighboring the current block and the bottom right reference sample neighboring the current block.

10. An apparatus for processing video based on an intra-prediction mode, the apparatus comprising:

a processor configured to:
generate a bottom right reference sample neighboring a current block, generate a right reference sample neighboring the current block and a bottom reference sample neighboring the current block, derive a first predictor and a second predictor based on the intra-prediction mode of the current block, wherein:

in response to a direction of the intra-prediction mode belonging to a region of a horizontal and positive angle, the second predictor is derived based on a reference sample neighboring a right of the current block, a top of the current block, or a top right of the current block, in response to a direction of the intra-prediction mode belonging to a region of a vertical and positive angle, the second predictor is derived based on a reference sample neighboring a left of the current block, a bottom of the current block, or a bottom left of the current block, and in response to a direction of the intra-prediction mode belonging to a region of a negative angle, the second predictor is derived based on a reference sample neighboring the right of the current block, the bottom of the current block, or a bottom right of the current block, and generate a prediction sample for the current block based on the first predictor and the second predictor.

* * * * *